US00RE41703E

(19) United States
(12) Reissued Patent
Pechanek et al.

(10) Patent Number: US RE41,703 E
(45) Date of Reissued Patent: Sep. 14, 2010

(54) METHODS AND APPARATUS FOR EFFICIENT SYNCHRONOUS MIMD OPERATIONS WITH IVLIW PE-TO-PE COMMUNICATION

(75) Inventors: Gerald George Pechanek, Cary, NC (US); Thomas L. Drabenstott, Cary, NC (US); Juan Guillermo Revilla, Austin, TX (US); David Strube, Raleigh, NC (US); Grayson Morris, Eindhoven (NL)

(73) Assignee: Altera Corp., San Jose, CA (US)

(21) Appl. No.: 10/872,995

(22) Filed: Jun. 21, 2004

Related U.S. Patent Documents

Reissue of:
(64) Patent No.: 6,446,191
Issued: Sep. 3, 2002
Appl. No.: 09/677,732
Filed: Oct. 2, 2000

U.S. Applications:
(63) Continuation of application No. 09/187,539, filed on Nov. 6, 1998, now Pat. No. 6,151,668.
(60) Provisional application No. 60/064,619, filed on Nov. 7, 1997.

(51) Int. Cl.
*G06F 15/16* (2006.01)

(52) U.S. Cl. ..... 712/24; 712/21
(58) Field of Classification Search ..... 712/22, 712/24, 215, 213, 19, 21, 15, 13, 20
See application file for complete search history.

(56) References Cited

U.S. PATENT DOCUMENTS 4,979,096 A 12/1990 Ueda
5,680,597 A * 10/1997 Kumar et al. ..... 712/226
5,930,508 A 7/1999 Faraboschi
5,951,674 A 9/1999 Moreno
5,963,745 A * 10/1999 Collins et al. ..... 712/13
5,968,160 A 10/1999 Saito
6,094,715 A 7/2000 Wilkinson
6,122,722 A 9/2000 Slavenburg

OTHER PUBLICATIONS

Pechanek, GG., et al., *M.F.A.S.T.: A Single Chip Highly Parallel Image Processing Architexture, IEEE,* vol. 3, pp. 69–72 (Oct. 23, 1995).
Supplementary European Search Report for European Patent Application No. 98957630.1 dated Jun. 30, 2005.

* cited by examiner

*Primary Examiner*—Eric Coleman
(74) *Attorney, Agent, or Firm*—Priest & Goldstein, PLLC

(57) ABSTRACT

A SIMD machine employing a plurality of parallel processor (PEs) in which communications hazards are eliminated in an efficient manner. An indirect Very Long Instruction Word instruction memory (VIM) is employed along with execute and delimiter instructions. A masking mechanism may be employed to control which PEs have their VIMs loaded. Further, a receive model of operation is preferably employed. In one aspect, each PE operates to control a switch that selects from which PE it receives. The present invention addresses a better machine organization for execution of parallel algorithms that reduces hardware cost and complexity while maintaining the best characteristics of both SIMD and MIMD machines and minimizing communication latency. This invention brings a level of MIMD computational autonomy to SIMD indirect Very Long Instruction Word (iVLIW) processing elements while maintaining the single thread of control used in the SIMD machine organization. Consequently, the term Synchronous-MIMD (SMIMD) is used to describe the present approach.

53 Claims, 18 Drawing Sheets

FIG. 4A

LV - LOAD MODIFY VLIW 400

ENCODING 410

411

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | 0 | UAF | | InstrCnt | | | | 0 | 0 | 0 | SU | LU | ALU | MAU | DSU | Vb | 0 | VIMOFFS | | | | | | | |

SYNTAX/OPERATION 420

| INSTRUCTION | OPERANDS | OPERATION |
|---|---|---|
| LV.[SP] | V[01], VIMOFFS,InstrCnt, d=(SLAMD), F=[AMD] | (V[01]+VIMOFFS)[SU] ← disable if (d=S)<br>(V[01]+VIMOFFS)[LU] ← disable if (d-L)<br>(V[01]+VIMOFFS)[ALU] ← disable if (d=A)<br>(V[01]+VIMOFFS)[MAU] ← disable if (d=M)<br>(V[01]+VIMOFFS)[DSU] ← disable if (d=D)<br><br>(V[01]+VIMOFFS)[UAF] ← ALU if (F=A or F=)<br>(V[01]+VIMOFFS)[UAF] ← MAU if (F=M)<br>(V[01]+VIMOFFS)[UAF] ← DSU if (F=D)<br><br>if (instrCnt > 0)<br>Load next InstrCnt instructions into<br>(V[01]+VIMOFFS) |

FIG. 4B

XV - EXECUTE VLIW 425

ENCODING 430

431

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | VX | UAF | | 0 | 0 | 0 | 0 | 0 | 0 | 0 | SU | LU | ALU | MAU | DSU | Vb | 0 | VIMOFFS | | | | | | | |

SYNTAX/OPERATION 435

| INSTRUCTION | OPERANDS | OPERATION |
|---|---|---|
| XV.[SP] | V[01], VIMOFFS, E={SLAMD}, F={AMDN} | Execute (V[01]+VIMOFFS)[SU] if (E=S)<br>Execute (V[01]+VIMOFFS)[LU] if (E=L)<br>Execute (V[01]+VIMOFFS)[ALU] if (E=A)<br>Execute (V[01]+VIMOFFS)[MAU] if (E=M)<br>Execute (V[01]+VIMOFFS)[DSU] if (E=D)<br><br>(V[01]+VIMOFFS)[UAF] ← ALU if (F= or F=A)<br>(V[01]+VIMOFFS)[UAF] ← MAU if (F=M)<br>(V[01]+VIMOFFS)[UAF] ← DSU if (F=D) |

FIG. 4C 442 444 440 INSTRUCTION FIELD DEFINITIONS 446

| NAME | BITS | DESCRIPTION/VALUES |
|---|---|---|
| ALU | 1 | ALU INSTRUCTION SLOT (USED BY LV AND XV INSTRUCTION)<br>0 = DO NOT DISABLE ALU SLOT (LV);DO NOT EXECUTE ALU SLOT (XV)<br>1 = DISABLE ALU SLOT (LV); EXECUTE ALU SLOT (XV) |
| CE2 | 2 | CONDITIONAL EXECUTION (T,F)<br>00 = EXECUTE INSTRUCTION. DO NOT AFFECT ARITHMETIC CONDITION FLAGS<br>01 = EXECUTE INSTRUCTION IF F0 = 1(TRUE). DO NOT AFFECT ARITHMETIC CONDITION FLAGS<br>10 = EXECUTE INSTRUCTION IF F0 = 0(FALSE). DO NOT AFFECT ARITHMETIC CONDITION FLAGS<br>11 = RESERVED |
| CtrlOp | 4 | FLOW CONTROL OPERATION<br>0000 = LOOP, LOOPI<br>0001 = RET<br>0010 = CALL<br>0011 = JMP<br>0100 = LV<br>0101 = XV<br>0110 = RESERVED<br>0111 = RESERVED<br>1000 = RESERVED<br>1001 = RETI<br>1010 = TRAP<br>1011 = RESERVED<br>1100 = RESERVED<br>1101 = RESERVED<br>1110 = NOP<br>1111 = SVC |
| DPack | 3 | INTEGER DATA PACKING<br>000 = 4 BYTES (4B)<br>001 = 2 HALFWORDS (2H)<br>010 = 1 WORD (1W)<br>011 = RESERVED<br>100 = 8 BYTES (8B)<br>101 = 4 HALFWORDS (4H)<br>110 = 2 WORDS (2W)<br>111 = 1 DOUBLEWORD (1D) |
| DSU | 1 | DSU INSTRUCTION SLOT (USED BY LV AND XV INSTRUCTION)<br>0 = DO NOT DISABLE DSU SLOT (LV); DO NOT EXECUTE DSU SLOT (XV)<br>1 = DISABLE DSU SLOT (LV); EXECUTE DSU SLOT (XV) |
| GROUP | 2 | INSTRUCTION GROUP<br>00 = RESERVED<br>01 = FLOW CONTROL<br>10 = LOAD/STORE (LU/SU)<br>11 = ARITHMETIC/LOGICAL (ALU, MAU, DSU) |

FIG. 4D

INSTRUCTION FIELD DEFINITIONS (CONTINUED) 440

| 442 | 444 | 446 |
|---|---|---|
| InstrCnt | 4 | INSTRUCTION COUNT - USED IN LV INSTRUCTION TO SPECIFY THE NUMBER OF INSTRUCTIONS TO LOAD<br>0xxx = 0 INSTRUCTIONS TO LOAD<br>1000 = 1 INSTRUCTION TO LOAD<br>1001 = 2 INSTRUCTIONS TO LOAD<br>1010 = 3 INSTRUCTIONS TO LOAD<br>1011 = 4 INSTRUCTIONS TO LOAD<br>1100 = 5 INSTRUCTIONS TO LOAD<br>1101 = RESERVED<br>1110 = RESERVED<br>1111 = RESERVED |
| LU | 1 | LU INSTRUCTION SLOT (USED BY LV AND XV INSTRUCTION)<br>0 = DO NOT DISABLE LU SLOT (LV); DO NOT EXECUTE LU SLOT (XV)<br>1 = DISABLE LU SLOT (LV); EXECUTE LU SLOT (XV) |
| MAU | 1 | MAU INSTRUCTION SLOT (USED BY LV AND XV INSTRUCTION)<br>0 = DO NOT DISABLE MAU SLOT (LV); DO NOT EXECUTE MAU SLOT (XV)<br>1 = DISABLE MAU SLOT (LV); EXECUTE MAU SLOT (XV) |
| S/P | 1 | SP/PE SELECT<br>0 = SP<br>1 = PE |
| SU | 1 | SU INSTRUCTION SLOT (USED BY LV AND XV INSTRUCTION)<br>0 = DO NOT DISABLE SU SLOT (LV); DO NOT EXECUTE SU SLOT (XV)<br>1 = DISABLE SU SLOT (LV); EXECUTE SU SLOT (XV) |
| UAF | 2 | UNIT AFFECTING FLAGS<br>00 = ALU<br>01 = MAU<br>10 = DSU<br>11 = RESERVED |
| UNIT | 2 | ARITHMETIC EXECUTION UNIT<br>00 = ALU<br>01 = MAU<br>10 = DSU<br>11 = RESERVED |
| Vb | 1 | VIM BASE REGISTER SELECT<br>0 = V0<br>1 = V1 |
| VimOffs | 8 | VIM OFFSET - CONTAINS THE OFFSET FROM THE BASE VIM ADDRESS REGISTER TO SELECT WHICH VIM TO LOAD (LV) OR EXECUTE (XV)<br>0-255 IS THE ARCHITECTED RANGE OF VLIW OFFSETS. PLEASE REFER TO YOUR SPECIFIC CONFIGURATION FOR THE VALID ADDRESSABLE VIM. |
| VX | 2 | VLIW EXTENSION - SPECIFIES IF THIS XV OVERRIDES THE LV UAF SETTING<br>0 = DO NOT OVERRIDE LV UAF SETTING<br>1 = OVERRIDE THE LV UAF SETTING WITH THE ONE SPECIFIED IN THE UAF FIELD |

FIG. 4E

ADD - ADD 450
ENCODING 455

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | ALUopcode | | | | | | Rt | | | | | Rx | | | | | Ry | | | | | 0 | CE2 | | OPack | | |
| | | | | | MAUopcode | | | | | | Rte | | | | 0 | Rxe | | | | 0 | Rye | | | | 0 | | | | | | |

SYNTAX/OPERATION 460

| INSTRUCTION | OPERANDS | OPERATION | ACF |
|---|---|---|---|
| | | | DOUBLEWORD |
| ADD.S[AM].1D | Rte,Rxe,Rye | Rto\|\|Rte←Rxo\|\|Rxe+Ryo\|\|Rye | NONE |
| [TF].ADD.S[AM].1D | Rte,Rxe,Rye | DO OPERATION ONLY IF T/F CONDITION IS SATISFIED IN F0 | NONE |
| | | | WORD |
| ADD.S[AM].1W | Rt,Rx,Ry | Rt←Rx+Ry | NONE |
| [TF].ADD.S[AM].1W | Rt,Rx,Ry | DO OPERATION ONLY IF T/F CONDITION IS SATISFIED IN F0 | NONE |
| | | | DUAL WORDS |
| ADD.S[AM].2W | Rte,Rxe,Rye | Rto←Rxo+Ryo<br>Rte←Rxe+Rye | NONE |
| [TF].ADD.S[AM].2W | Rte,Rxe,Rye | DO OPERATION ONLY IF T/F CONDITION IS SATISFIED IN F0 | NONE |
| | | | DUAL HALFWORDS |
| ADD.S[AM].2H | Rt,Rx,Ry | Rt.H1←Rx.H1+Ry.H1<br>Rt.H0←Rx.H0+Ry.H0 | NONE |
| [TF].ADD.S[AM].2H | Rt,Rx,Ry | DO OPERATION ONLY IF T/F CONDITION IS SATISFIED IN F0 | NONE |
| | | | QUAD HALFWORDS |
| ADD.S[AM].4H | Rte,Rxe,Rye | Rto.H1←Rxo.H1+Ryo.H1<br>Rto.H0←Rxo.H0+Ryo.H0<br>Rte.H1←Rxe.H1+Rye.H1<br>Rte.H0←Rxe.H0+Rye.H0 | NONE |
| [TF].ADD.S[AM].4H | Rte,Rxe,Rye | DO OPERATION ONLY IF T/F CONDITION IS SATISFIED IN F0 | NONE |
| | | | QUAD BYTES |
| ADD.S[AM].4B | Rt,Rx,Ry | Rt.B3←Rx.B3+Ry.B3<br>Rt.B2←Rx.B2+Ry.B2<br>Rt.B1←Rx.B1+Ry.B1<br>Rt.B0←Rx.B0+Ry.B0 | NONE |
| [TF].ADD.S[AM].4B | Rt,Rx,Ry | DO OPERATION ONLY IF T/F CONDITION IS SATISFIED IN F0 | NONE |
| | | | OCTAL BYTES |
| ADD.S[AM].8B | Rte,Rxe,Rye | Rto.B3←Rxo.B3+Ryo.B3<br>Rto.B2←Rxo.B2+Ryo.B2<br>Rto.B1←Rxo.B1+Ryo.B1<br>Rto.B0←Rxo.B0+Ryo.B0<br>Rte.B3←Rxe.B3+Rye.B3<br>Rte.B2←Rxe.B2+Rye.B2<br>Rte.B1←Rxe.B1+Rye.B1<br>Rte.B0←Rxe.B0+Rye.B0 | NONE |
| [TF].ADD.S[AM].8B | Rte,Rxe,Rye | DO OPERATION ONLY IF T/F CONDITION IS SATISFIED IN F0 | NONE |

FIG. 4F1

470

480

| VLIW | PE # | LOAD UNIT (LU) | MULTIPLY-ACCUMULATE UNIT (MAU) | ARITHMETIC LOGIC UNIT (ALU) |
|---|---|---|---|---|
| 27 | 0 | | | |
| | 1 | load nx1 | nx3 = Lx | ny1 = Ly + (nx1 = Lx + nz1 = Lz) |
| | 2 | load ny1 | ny3 = Ly | (n2=L)<=0? |
| | 3 | load nz1 | nz3 = Lz | nx3 = Lx + nz3 = Lz |
| 28 | 0 | | | |
| | 1 | load nx2 | nx1 = Lx | nx1 = Lx + nz1 = Lz |
| | 2 | load ny2 | ny1 = Ly | nz2 = Lz + (nx2 = Lx + ny2 = Ly) |
| | 3 | load nz2 | nz1 = Lz | (n3=L)<=0? |
| 29 | 0 | | | |
| | 1 | load nx3 | nx2 = Lx | (n1=L)<=0? |
| | 2 | load ny3 | ny2 = Ly | nx2 = Lx + ny2 = Ly |
| | 3 | load nz3 | nz2 = Lz | ny3 = Ly + (nx3 = Lx + nz3 = Lz) |

490

| VLIW | PE # | LOAD UNIT (LU) | MULTIPLY-ACCUMULATE UNIT (MAU) | ARITHMETIC LOGIC UNIT (ALU) |
|---|---|---|---|---|
| 27 | 0 | | | |
| | 1 | li.p.w R1,A1+,A7 | fmpy.pm.1fw R6,R3,R31 | fadd.pa. 1fw R10,R9,R8 |
| | 2 | li.p.w R1,A1+,A7 | fmpy.pm.1fw R6,R3,R31 | fcmpLE.pa.1 fw R10,R0 |
| | 3 | li.p.w R1,A1+, A7 | fmpy.pm.1fw R6,R3,R31 | fadd.pa. 1fw R9,R7,R6 |
| 28 | 0 | | | |
| | 1 | li.p.w R2,A1+, A7 | fmpy.pm.1fw R4,R1,R31 | fadd.pa. 1fw R9,R7,R4 |
| | 2 | li.p.w R2,A1+, A7 | fmpy.pm.1fw R4,R1,R31 | fadd.pa. 1fw R10,R9,R8 |
| | 3 | li.p.w R2,A1+, A7 | fmpy.pm.1fw R4,R1,R31 | fcmpLE.pa.1 fw R10,R0 |
| 29 | 0 | | | |
| | 1 | li.p.w R3,A1+, A7 | fmpy.pm.1fw R5,R2,R31 | fcmpLE.pa.1 fw R10,R0 |
| | 2 | li.p.w R3,A1+, A7 | fmpy.pm.1fw R5,R2,R31 | fadd.pa. 1fw R9,R7,R5 |
| | 3 | li.p.w R3,A1+, A7 | fmpy.pm.1fw R5,R2,R31 | fadd.pa. 1fw R10,R9,R8 |

491 493 495 497

FIG. 4F2

| DATA SELECT UNIT (DSU) | STORE UNIT (SU) |
|---|---|
| | STORE 1 INTO F1 |
| get nz1 = Lz | advance to and store n1L |
| send ny3 = Ly | if so, store 0 over n2L |
| get ny3 = Ly / send NEW nz1 = Lz | |
| | STORE 1 INTO F2 |
| get ny1 = Ly / send nx2 = Lx | |
| get nx2 = Lx / send ny1 = Ly | advance to and store n2L |
| | if so, store 0 over n3L |
| | STORE 1 INTO F3 |
| send nx3 = Lx | if so, store 0 over n1L |
| get nz2 = Lz | |
| get nx3 = Lx / send nz2 = Lz | advance to and store n3L |
| | |
| | si.p.w R1,A2+,R28 |
| pexchg.pd.w R7,R0,2x2_PE3 | si.p.w R10,+A2,A6 |
| pexchg.pd.w R15,R6,2x2_PE2 | t.sii.p.w R0,A2+,0 |
| pexchg.pd.w R8,R4,2x2_PE2 | |
| | si.p.w R1,A2+,R28 |
| pexchg.pd.w R8,R5,2x2_PE2 | |
| pexchg.pd.w R7,R4,2x2_PE1 | si.p.w R10,+A2,A6 |
| | t.sii.p.w R0,A2+,0 |
| | si.p.w R1,A2+,R28 |
| pexchg.pd.w R15,R6,2x2_PE1 | t.sii.p.w R0,A2+,0 |
| pexchg.pd.w R8,R0,2x2_PE3 | |
| pexchg.pd.w R7,R5,2x2_PE1 | si.p.w R10,+A2,A6 |

METHODS AND APPARATUS FOR EFFICIENT SYNCHRONOUS MIMD OPERATIONS WITH IVLIW PE-TO-PE COMMUNICATION

Matter enclosed in heavy brackets [ ] appears in the original patent but forms no part of this reissue specification; matter printed in italics indicates the additions made by reissue.

RELATED APPLICATIONS

The present application is a continuation of Ser. No. 09/187,539, filed on Nov. 6, 1998, now U.S. Pat. No. 6,151,668.

The present invention claims the benefit of U.S. Provisional Application Ser. No. 60/064,619 entitled "Methods and Apparatus for Efficient Synchronous MIMD VLIW Communication" and filed Nov. 7, 1997.

FIELD OF THE INVENTION

For any Single Instruction Multiple Data stream (SIMD) machine with a given number of parallel processing elements, there will exist algorithms which cannot make efficient use of the available parallel processing elements, or in other words, the available computing resources. Multiple Instruction Multiple Data stream (MIMD) class machines execute some of these algorithms with more efficiency but require additional hardware to support a separate instruction stream on each processor and lose performance due to communication latency with lightly coupled program implementations. The present invention addresses a better machine organization for execution of these algorithms that reduces hardware cost and complexity while maintaining the best characteristics of both SIMD and MIMD machines and minimizing communication latency. The present invention provides a level of MIMD computational autonomy to SIMD indirect Very Long Instruction Word (iVLIW) processing elements while maintaining the single thread of control used in the SIMD machine organization. Consequently, the term Synchronous-MIMD (SMIMD) is used to describe the invention.

BACKGROUND OF THE INVENTION

There are two primary parallel programming models, the SIMD and the MIMD models. In the SIMD model, there is a single program thread which controls multiple processing elements (PEs) in a synchronous lock-step mode. Each PE executes the same instruction but on different data. This is in contrast to the MIMD model where multiple program threads of control exist and any inter-processor operations must contend with the latency that occurs when communicating between the multiple processors due to requirements to synchronize the independent program threads prior to communicating. The problem with SIMD is that not all algorithms can make efficient use of the available parallelism existing in the processor. The amount of parallelism inherent in different algorithms varies leading to difficulties in efficiently implementing a wide variety of algorithms on SIMD machines. The problem with MIMD machines is the latency of communications between multiple processors leading to difficulties in efficiently synchronizing processors to cooperate on the processing of an algorithm. Typically, MIMD machines also incur a greater cost of implementation as compared to SIMD machines since each MIMD PE must have its own instruction sequencing mechanism which can amount to a significant amount of hardware. MIMD machines also have an inherently greater complexity of programming control required to manage the independent parallel processing elements. Consequently, levels of programming complexity and communication latency occur in a variety of contexts when parallel processing elements are employed. It will be highly advantageous to efficiently address such problems as discussed in greater detail below.

SUMMARY OF THE INVENTION

The present invention is preferably used in conjunction with the ManArray architecture various aspects of which are described in greater detail in U.S. patent application Ser. No. 08/885,310 filed Jun. 30, 1997, now U.S. Pat. No. 6,023,753, U.S. Ser. No. 08/949,122 filed Oct. 10, 1997, now U.S. Pat. No. 6,167,502, U.S. Ser. No. 09/169,255 filed Oct. 9, 1998, now U.S. Pat. No. 6,343,356, U.S. Ser. No. 09/169,256 filed Oct. 9, 1998 now U.S. Pat. No. 6,167,501 and U.S. Ser. No. 09/169,072 filed Oct. 9, 1998, now U.S. Pat. No. 6,219,776, Provisional Application Ser. No. 60/067,511 entitled "Method and Apparatus for Dynamically Modifying Instructions in a Very Long Instruction Word Processor" filed Dec. 4, 1997, Provisional Application Ser. No. 60/068,021 entitled "Methods and Apparatus for Scalable Instruction Set Architecture" filed Dec. 18, 1997, Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution" filed Jan. 28, 1998, Provisional Application Ser. No. 60/077,766 entitled "Register File Indexing Methods and Apparatus for Providing Indirect Control of Register in a VLIW Processor", filed Mar. 12, 1998, Provisional Application Ser. No. 60/092,130 entitled "Methods and Apparatus for Instruction Addressing in Indirect VLIW Processors" filed on Jul. 9, 1998, Provisional Application Ser. No. 60/103,712 entitled "Efficient Complex Multiplexing and Fast Fourier Transform (FFT) Implementation on the ManArray" filed on Oct. 9, 1998, and Provisional Application Ser. No. 60/106,867 entitled "Methods and Apparatus for Improved Motion Estimation for Video Encoding" filed on Nov. 3, 1998, respectively, all of which are assigned to the assignee of the present invention and incorporated herein in their entirety.

A ManArray processor suitable for use in conjunction with ManArray indirect Very Long Instruction Words (iVLIWs) in accordance with the present invention may be implemented as an array processor that has a Sequence Processor (SP) acting as an array controller for a scalable array of Processing Elements (PEs) to provide an indirect Very Long Instruction Word architecture. Indirect Very Long Instruction Words (iVLIWs) in accordance with the present invention may be compared in an iVLIW Instruction Memory (VIM) by the SIMD array controller. Sequence Processor or SP. Preferably, VIM exists in each Processing Element or PE and contains a plurality of iVLIWs. After an iVLIW is composed in VIM, another SP instruction, designated XV for "execute iVLIW" in the preferred embodiment, concurrently executes the iVLIW at an identical VIM address in all PEs. If all PE VIMs contain the same instructions, SIMD operation occurs. A one-to-one mapping exists between the XV instruction and the single identical iVLIW that exists in each PE.

To increase the efficiency of certain algorithms running on the ManArray, it is possible to operate indirectly on VLIW instructions stored in a VLIW memory with the indirect execution initiated by an execute VLIW (XV) instruction and with different VLIW instructions stored in the multiple PEs at the same VLIW memory address. When the SP instruction causes this set of iVLIWs to execute concurrently across all PEs, Synchronous MIMD or SMIMD operation occurs. A one-to-many mapping exists between the XV instruction and the multiple different iVLIWs that exist in each PE. No specialized synchronization mechanism is necessary since the multiple different iVLIW executions are instigated synchronously by the single controlling point SP with the issuance of the XV instruction. Due to the use of a Receive Model to govern communication between PEs and a ManArray network, the communication latency characteristic common to MIMD operations is avoided as discussed further below. Additionally, since there is only one synchronous locus of execution, additional MIMD hardware for separate program flow in each PE is not required. In this way, the machine is organized to support SMIMD operations at a reduced hardware cost while minimizing communication latency.

A ManArray indirect VLIW or iVLIW is preferably loaded under program control, although the alternatives of direct memory access (DMA) loading of the iVLIWs and implementing a section of VIM address space with ROM containing fixed iVLIWs are not precluded. To maintain a certain level of dynamic program flexibility, a portion of VIM, if not all of the VIM, will typically be of the random access type of memory. To load the random access type of VIM, a delimiter instruction, LV for Load iVLIW, specifies that a certain number of instructions that follow the delimiter are to be loaded into the VIM rather than executed. For SIMD operation, each PE gets the same instructions for each VIM address. To set up for SMIMD operation it is necessary to load different instructions at the same VIM address in each PE.

In the presently preferred embodiment, this is achieved by a masking mechanism that functions such that the loading of VIM only occurs on PEs that are masked ON. PEs that are masked OFF do not execute the delimiter instruction and therefore do not load the specified set of instructions that follow the delimiter into the VIM. Alternatively, different instructions could be loaded in parallel from the PE local memory or the VIM could be the target of a DMA transfer. Another alternative for loading different instructions into the same VIM address is through the use of a second LV instruction, LV2, which has a second 32-bit control word that follows the LV instruction. The first and second control words rearrange the bits between them so that a PE label can be added. This second LV2 approach does not require the PEs to be masked and may provide some advantages in different system implementations. By selectively loading different instructions into the same VIM address on different PEs, the ManArray is set up for the SMIMD operation.

One problem encountered when implementing SMIMD operation is in dealing with inter-processing element communication. In SIMD mode, all PEs in the array are executing the same instruction. Typically, these SIMD PE-to-PE communications instructions are thought of as assigning a Send Model. That is to say, the SIMD Send Model communication instructions indicate in which direction or to which target PE, each PE should send its data. When a communication instruction such as SEND-WEST is encountered, each PE sends data to the PE topologically defined as being its western neighbor. The Send Model specifies both sender and receiver PEs. In the SEND-WEST example, each PE sends its data to its West PE and receives data from its East PE. In SIMD mode, this is not a problem.

In SMIMD mode of operation, using a Send Model, it is possible for multiple processing elements to all attempt to send data to the same neighbor. This attempt presents a hazardous situation because processing elements such as those in the ManArray may be defined as having only one receive port, capable of receiving from only one other processing element at a time. When each processing element is defined as having one receipt port, such an attempted operation cannot complete successfully and results in a communication hazard.

To avoid the communication hazard described above, a Receive Model is used for the communication between PEs. Using the Receive Model, each processing element controls a switch that selects from which processing element it receives. It is impossible for communication hazards to occur because it is impossible for any two processing elements to contend for the same receive port. By definition, each PE controls its own receive port and makes data available without target PE specification. For any meaningful communication to occur between processing elements using the Receive Model, the PEs must be programmed to cooperate in the receiving of the data that is made available. Using Synchronous MIMD (SMIMD), this is guaranteed to occur if the cooperating instructions all exist at the same iVLIW location. Without SMIMD, a complex mechanism would be necessary to synchronize communications and use the Receive Model.

A more complete understanding of the present invention, as well as further features and advantages of the invention will be apparent from the following Detailed Description and the accompanying drawings.

BRIEF DESCRIPTION OF THE DRAWINGS

FIG. 4A shows an LV Load/Modify VLIW instruction;

FIG. 4B shows an XV Execute VLIW Instruction;

FIG. 4C shows instruction field definitions;

FIG. 4D shows further instruction field definitions;

FIG. 4E shows an ADD Instruction;

FIGS. 4F1 and 4F2 illustrate slot storage for three Synchronous MIMD iVLIWs in a 2×2 ManArray configuration;

DETAILED DESCRIPTION

Figure 1:
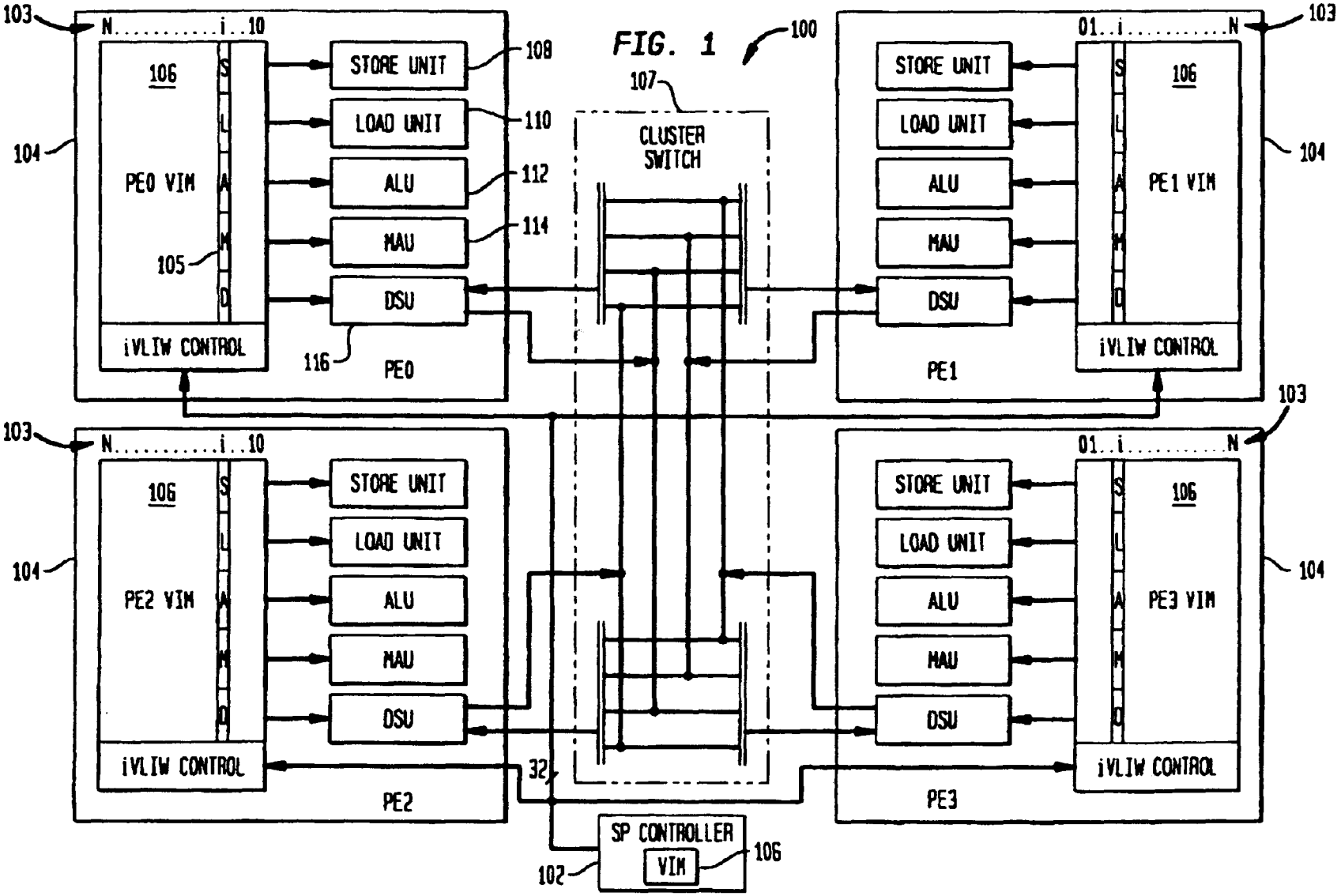
FIG. 1 illustrates various aspects of ManArray indirect VLIW instruction memory in accordance with the present invention.

One set of presently preferred indirect Very Long Instruction Word (iVLIW) control instructions for use in conjunction with the present invention is described in detail below. FIG. 1 depicts a system for the execution of the iVLIWs at Address "i", where the iVLIW is indicated by the vertical set of boxes SLAMD 105 in each VIM representing a S=Store, L=Load, A=Arithmetic Logic Unit (ALU), M=Multiply Accumulate Unit (MAU), and D=Data Select Unit (DSU) set of instructions, in a 2×2 ManArray 100 of PEs 104, PE0–PE3. In FIG. 1, the 2×2 ManArray 100 further includes a sequence processor (SP) controller 102 which dispatches 32-bit instructions to the array PEs over a single 32-bit bus. One type of 32-bit instructions is an execute iVLIW (XV) instruction which contains a VIM address offset value that is used in conjunction with a VIM base address to generate a pointer to the iVLIW which is desired to be executed. The PEs 104 are interconnected by a cluster switch 107.

The SP 102 and each PE 104 in the ManArray architecture as adapted for use in accordance with the present invention contains a quantity of iVLIW memory (VIM) 106 as shown in FIG. 1. Each VIM 106 contains storage space to hold multiple VLIW instruction Addresses 103, and each Address is capable of storing up to eight simplex instructions. Presently preferred implementations allow each iVLIW instruction to contain up to five simplex instructions: one associated with each of the Store Unit 108, Load Unit 110, Arithmetic Logic Unit 112 (ALU), Multiply-Accumulate Unit 114 (MAU), and Data-Select Unit 116 (DSU) 116. For example, an iVLIW instruction at VIM address "i" 105 contains the five instructions SLAMD.

Figure 2:
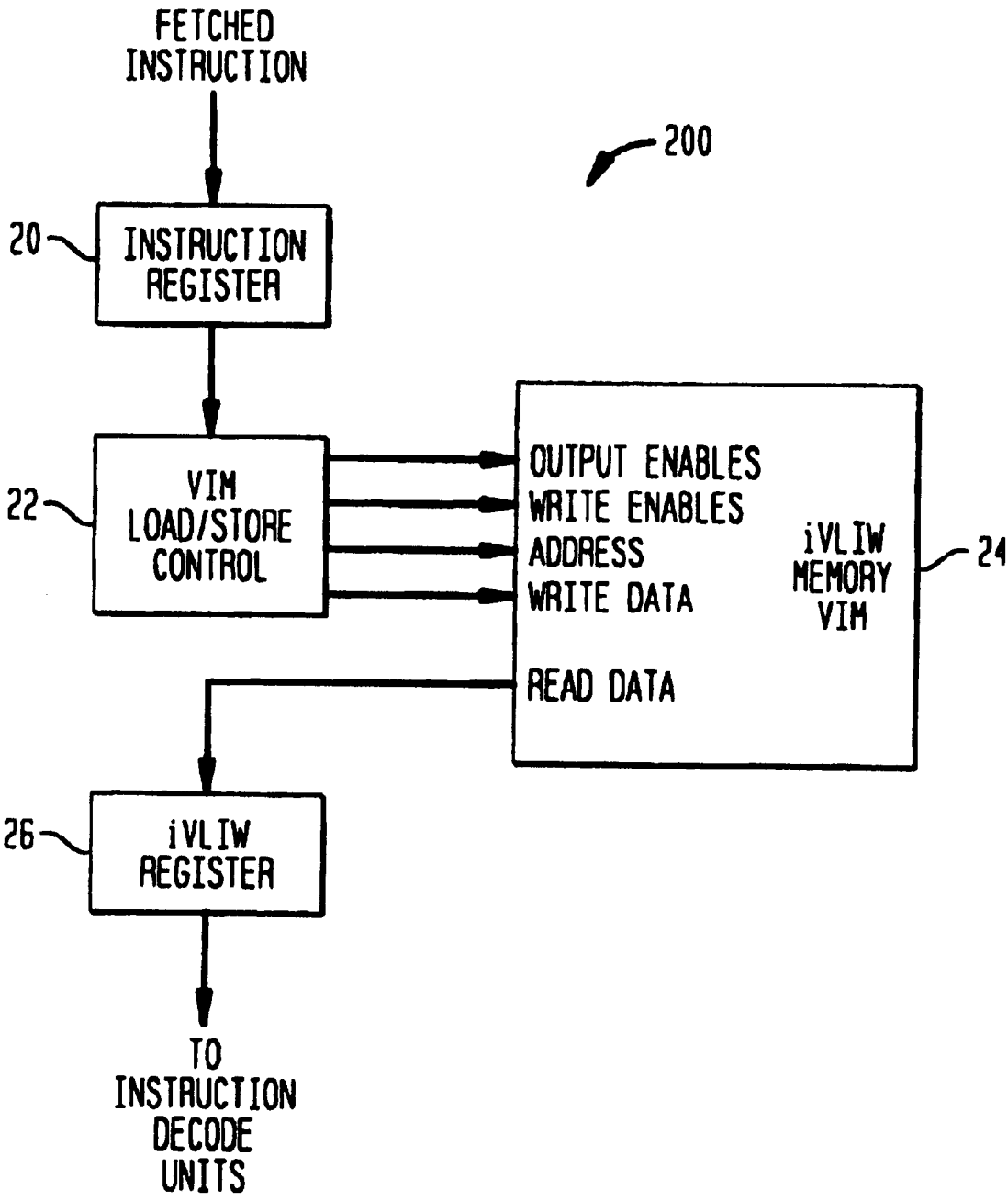
FIG. 2 illustrates a basic iVLIW Data Path.
Figure 3:
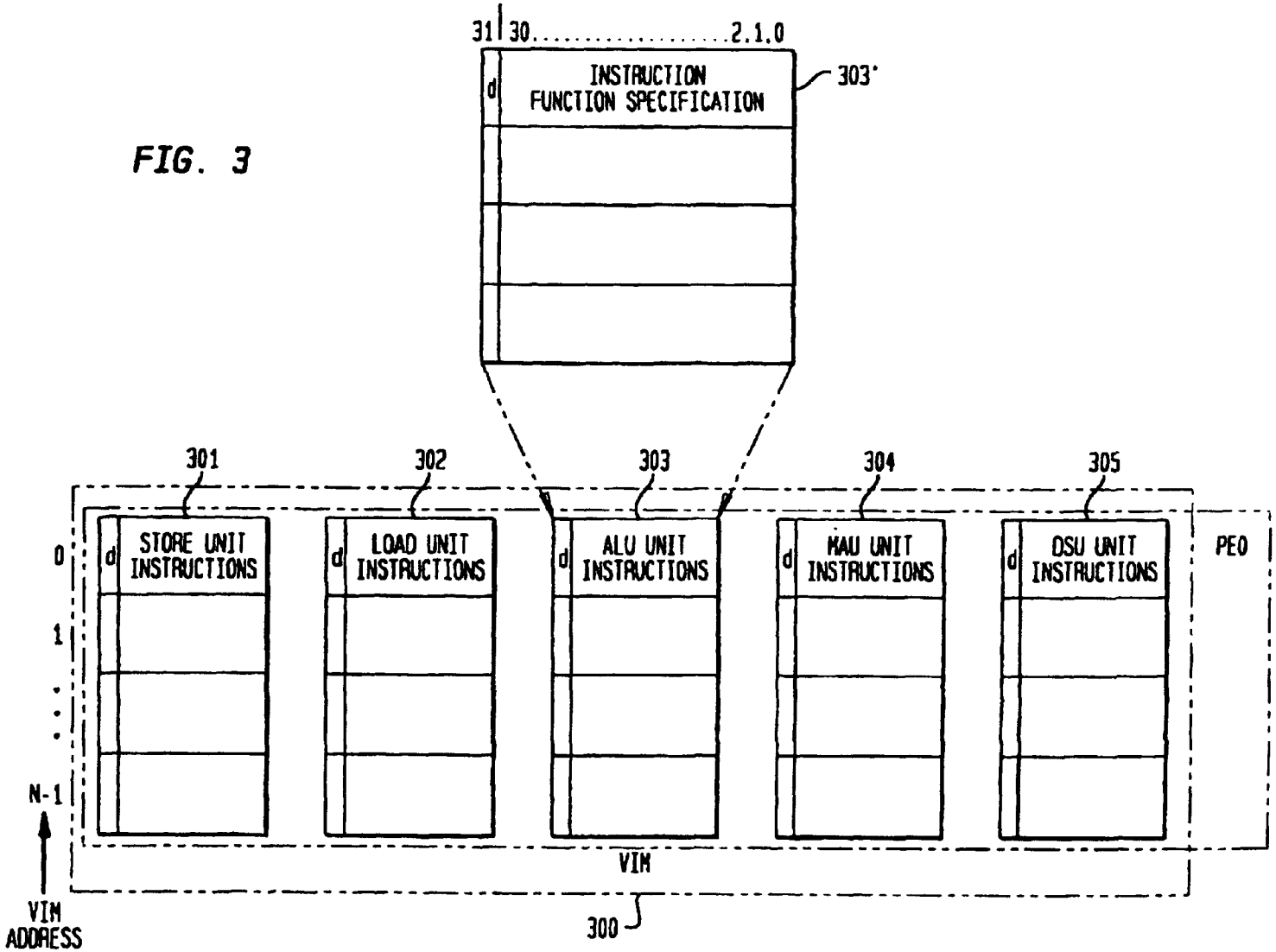
FIG. 3 illustrates a five slot iVLIW with an expanded view of the ALU slot.

FIG. 2 shows a basic iVLIW data path arrangement 200 by which a fetched instruction is stored in an Instruction Register 20 which is connected to the VIM Load and Store Control function 22. The VIM Load and Store Control function provides the interface signals to VIM 24. The VIM 24 corresponds to VIM 106, with each VIM 106 of FIG. 1 having associated registers and controls, such as those shown in FIG. 2. The output of the VIM 24 is pipelined to the iVLIW register 26. FIG. 3 illustrates a Five Slot iVLIW VIM 300 with N entries, 0, 1, . . . N−1. Each VIM 300 addressed location includes storage space for Store, Load, ALU, MAU and DSU instructions 301–305. An expanded ALU slot view 303' shows a 32-bit storage space with bit-31 "d" highlighted. The use of the instruction bits in VIM storage will be discussed in greater detail below.

iVLIW instructions can be loaded into an array of PE VIMs collectively, or, by using special instructions to mask a PE or PEs, each PE VIM can be loaded individually. The iVLIW instructions in VIM are accessed for execution through the Execute VLIW (XV) instruction, which, when executed as a single instruction, causes the simultaneous execution of the simplex instructions located at the VIM memory address. An XV instruction can cause the simultaneous execution of:

1. all of the simplex instructions located in an individual SP's or PE's VIM address, or
2. all instructions located in all PEs at the same relative VIM address, or
3. all instructions located at a subset or group of all PEs at the same relative VIM address.

Only two control instructions are necessary to load/modify iVLIW memories, and to execute iVLIW instructions. They are:

1. Load/Modify VLIW Memory Address (LV) illustrated in FIG. 4A, and
2. Execute VLIW (XV) illustrated in FIG. 4B.

The LV instruction 400 shown in FIG. 4A is for 32 bit encoding as shown in encoding block 410 and has the presently preferred syntax/operation shown in syntax/operation block 420 as described further below. The LV instruction 400 is used to load and/or disable individual instruction slots of the specified SP or PE VLIW Memory (VIM). The VIM address is computed as the sum of a base VIM address register Vb (V0 or V1) plus an unsigned 8-bit offset VIMOFFS shown in bits 0–7, the block of bits 411, of encoding block 410 in FIG. 4A. The VIM address must be in the valid range for the hardware configuration otherwise the operation of this invention in undefined.

Any combination of individual instruction slots may be disabled via the disable slot parameter 'd={SLAMD}', where S=Store Unit (SU), L=Load Unit (LU), A=Arithmetic Logic Unit (ALU), M=Multiply-Accumulate Unit (MAU) and D=Data Select Unit (DSU). A blank 'D='parameter does not disable any slots. Specified slots are disabled prior to any instructions that are loaded.

The number of instructions to load are specified utilizing an InstrCnt parameter. For the present implementation, valid values are 0–5. The next InstrCnt instructions following LV are loaded into the specified VIM. The Unit Affecting Flags (UAF) parameter 'F=[AMD]' selects which arithmetic instruction slot (A=ALU, M=MAU, D=DSU) is allowed to set condition flags for the specified VIM when it is executed. A blank 'F=' selects the ALU instruction slot. During processing of the LV instruction no arithmetic flags are affected and the number of cycles is one plus the number of instructions loaded.

The XV instruction 425 shown in FIG. 4B is also for 32 bit encoding as shown in encoding block 430 and has the presently preferred syntax/operation shown in syntax/operation block 435 as described further below. The XV instruction 425 is used to execute individual instruction slots of the specified SP or PE VLIW Memory (VIM). The VIM address is computed as the sum of a base VIM address register Vb (V0 or V1) plus an unsigned 8-bit offset VIMOFFS shown in bits 0–7, the block of bits 431, of encoding blocks 430 of FIG. 4B. The VIM address must be in the valid range for the hardware configuration otherwise the operation of this instruction is undefined.

Any combination of individual instruction slots may be executed via the execute slot parameter 'E={SLAMD}', where S=Store Unit (SU), L=Load Unit (LU), A=Arithmetic Logic Unit (ALU), M=Multiply-Accumulate Unit (MAU), D=Data Select Unit (DSU). A blank 'E=' parameter does not execute any slots. The Unit Affecting Flags (UAF) parameter 'F={AMDN}' overrides the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified by the LV instruction. A blank 'F=' selects the UAF specified when the VLIW was loaded.

Condition flags are set by the individual simplex instruction in the slot specified by the setting of the 'F= parameter from the original LV instruction or as overridden by an 'F=[AMD]' parameter in the XV instruction. Condition flags are not affected when 'F=N'. Operation occurs in one cycle. Pipeline considerations must be taken into account based upon the individual simplex instructions in each of the slots that are executed. Descriptions of individual fields in these iVLIW instructions are shown in FIGS. 4C and 4D. FIGS. 4C and 4D show Instruction Field Definitions 440 tabulated by Name 442, number of bits 444 and description values 446. FIGS. 4E and 4F illustrate a presently preferred ADD instruction and slot storage for three synchronous MIMD iVLIWs in a 2×2 ManArray configuration, respectively.

The ADD instruction 450 shown in FIG. 4E is again for 32 bit encoding as shown in encoding block 455 and has the presently preferred syntax/operation shown in syntax/operation block 460 as described further below. ADD instruction 450 is used to store the sum of source registers $R_x$ and $R_y$ in target register $R_r$. Arithmetic scalar flags are affected on least significant operation where N=MSB of resulting sum, Z=1 if result is zero, and is otherwise 0, V=1 if an overflow occurs, and is otherwise 0, and C=1 if a carry occurs, and is otherwise 0. The v bit is meaningful for signed operations, and the C bit is meaningful for unsigned operations. The number of cycles is one.

Individual, Group, and "Synchronous MIMD" PE iVLIW Operations

The LV and XV instructions may be used to load, modify, disable, or execute iVLIW instructions in individual PEs or PE groups defined by the programmer. To do this, individual PEs are enabled or disabled by an instruction which modifies a Control Register located in each PE which, among other things, enables or disables each PE. To load and operate an individual PE or a group of PEs, the control registers are modified to enable individual PE(s), and to disable all others. Normal iVLIW instructions will then operate only on PEs that are enabled.

Figure 5:
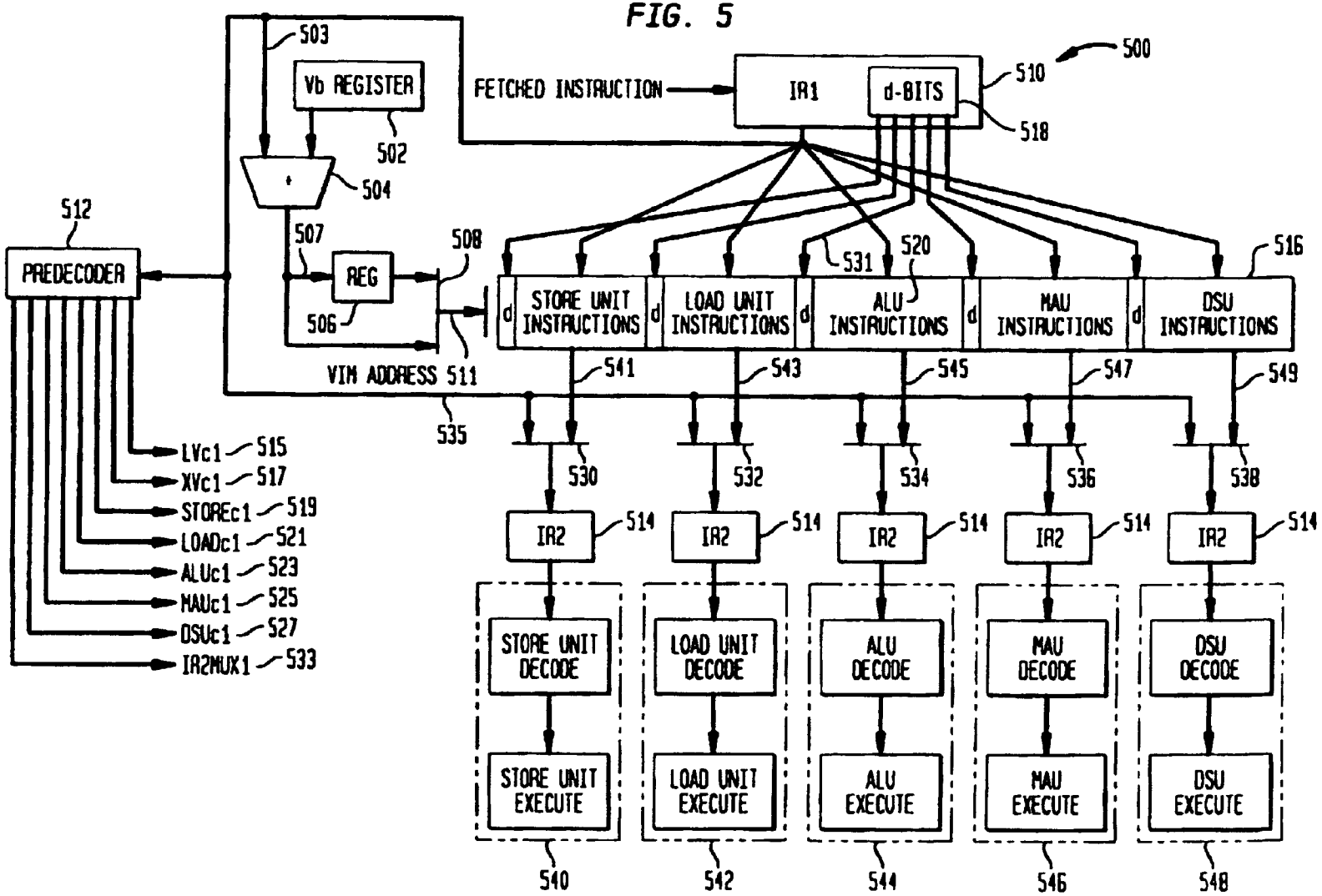
FIG. 5 illustrates an iVLIW load and fetch pipeline in accordance with the present invention.

Referring to FIG. 5, aspects of the iVLIW load and fetch pipeline are described in connection with an iVLIW system 500. Among its other aspects. FIG. 5 shows a selection mechanism for allowing selection of instructions out of VIM memory. A fetched instruction is loaded into a first instruction register (IR1) 510. Register 510 corresponds generally with instruction register 20 of FIG. 2. The output of IR1 is pre-decoded in predecoder or precode function 512 early in the pipeline cycle prior to loading the second instruction register (IR2) 514. When the instructions in IR1 is a Load iVLIW instruction (LV) with a non-zero instruction count, the pre-decoder 512 generates an LVe1 control signal 515, which is used to set up the LV operation cycle, and the VIM address 511 is calculated by use of the specified Vb register 502 address by an adder 504 to an offset value included in the LV instruction via path 503. The resulting VIM address 511 is stored in register 506 and passed through multiplexer 508 to address the VIM 516. VIM 516 corresponds generally to VIM 106 of FIG. 1. Register 506 is required to hold the VIM address 507 during the LV operations. The VIM address 511 and LV control state allow the loading of the instructions received after the LV instruction into the VIM 516. At the end of the cycle in which the LV was received, the disable bits 10–17, shown in FIG. 4A, are loaded into the d-bits register 518 for use when loading instructions into the VIM 516. Upon receipt of the next instruction in IR1 510, which is to be loaded into VIM 516, the appropriate control signal is generated depending upon the instruction type, Storec1 518, Loadc1 521, ALUc1 523, MAUc1 525, or DSUc1 527. The pre-decode function 512 is preferably provided based upon a simple decoding of the Group bits (bits 30 and 31) which define the instruction type shown in FIGS. 4A, B and E and the Unit field bits (bits 27 and 28 which specify the execution unit type) shown in FIGS. 4D and 4E. By using this pre-decode step, the instruction in IR1 510 can be loaded into VIM 516 in the proper functional unit position. For example, for the ADD instruction of FIG. 4E, included in the LV list of instructions, when this instruction is received into IR1 510 it can be determined by the pre-decode function 512 that this instruction should be loaded into the ALU instruction slot 520 in VIM 516. In addition, the appropriate d-bit 531 for that functional slot position is loaded into bit-31 of that slot. The loaded d-bit comprises one of the group code bit positions from the original instruction.

Upon receipt of an XV instruction in IR1 510, the VIM address 511 is calculated by use of the specified Vb register 502 added by adder 504 to the offset value included in the XV instruction via path 503. The resulting VIM Address 507 is passed through multiplexer 508 to address the VIM. The iVLIW at the specified address is read out of the VIM 516 and passes through the multiplexers 530, 532, 534, 536, and 538, to the IR2 registers 514. As an alternative to minimize the read VIM access timing critical path, the output of VIM 516 can be latched into a register whose output is passed through a multiplexer prior to the decode state logic.

For execution of the XV instruction, the IR2MUX1 control signal 533 in conjunction with the pre-decode XVc1 control signal 517 causes all the IR2 multiplexers, 530, 532, 534, 536, and 538, to select the VIM output paths, 541, 543, 545, 547, and 549. At this point, the five individual decode and execution stages of the pipeline, 540, 542, 544, 546, and 548, are completed in synchrony providing the iVLIW parallel execution performance. To allow a single 32-bit instruction to execute by itself in the PE or SP, the bypass VIM path 533 is shown. For example, when a simplex ADD instruction is received into IR1 510 for parallel array execution, the pre-decode function 512 generates the IR2MUX1 533 control signal, which in conjunction with the instruction type pre-decode signal, 523 in the case of an ADD, and lack of an XV 517 or LV 515 active control signal, causes the ALU multiplexer 534 to select the bypass path 535.

Figure 6:
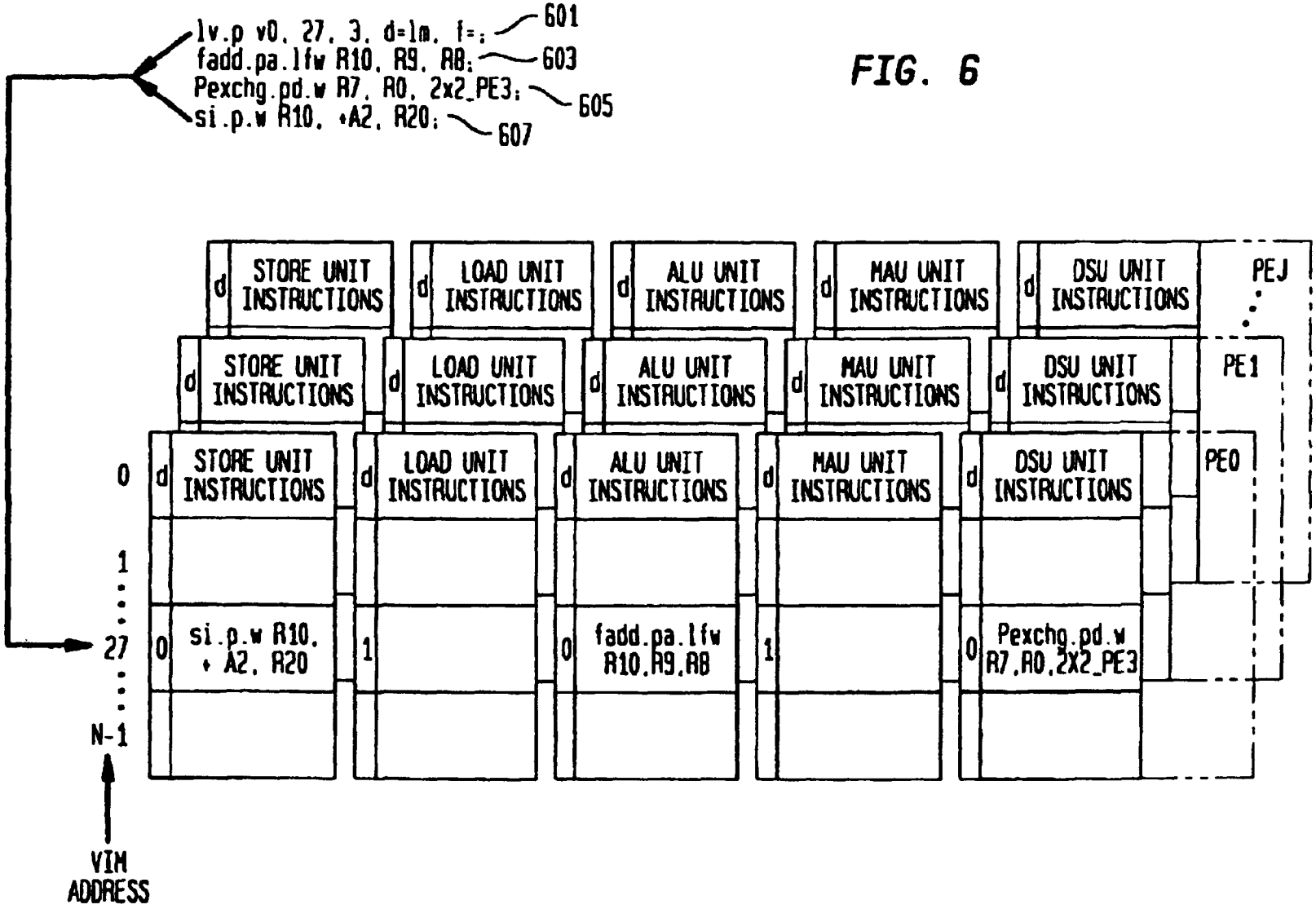
FIG. 6 illustrates aspects of SIMD iVLIW Array processing.

Since a ManArray can be configured with a varying number of PEs, FIG. 6 shows an exemplary SIMD iVLIW usage of an iVLIW system such as the system 500 shown in FIG. 5. In FIG. 6, there are J+1 PEs as indicated by the PE numbering PE0 to PE1. A portion of LV code is shown in FIG. 6 indicating that three instructions are to be loaded at VIM address 27 with the Load Unit and MAU instruction slots being disabled. This loading operation is determined from the LV instruction 601 based upon the syntax shown in FIG. 4A. Assuming all PEs are masked on, then the indicated three instructions 603, 605, and 607, will be loaded at VIM address 27 in each of the J+1 PEs in the array. The result of this loading is indicated in FIG. 6 by showing the instructions stored in their appropriate execution slot in the VIMs, instruction 603 in the ALU slot, instruction 605 in the DSU slot, and instruction 607 in the Store Unit slot.

Figure 7:
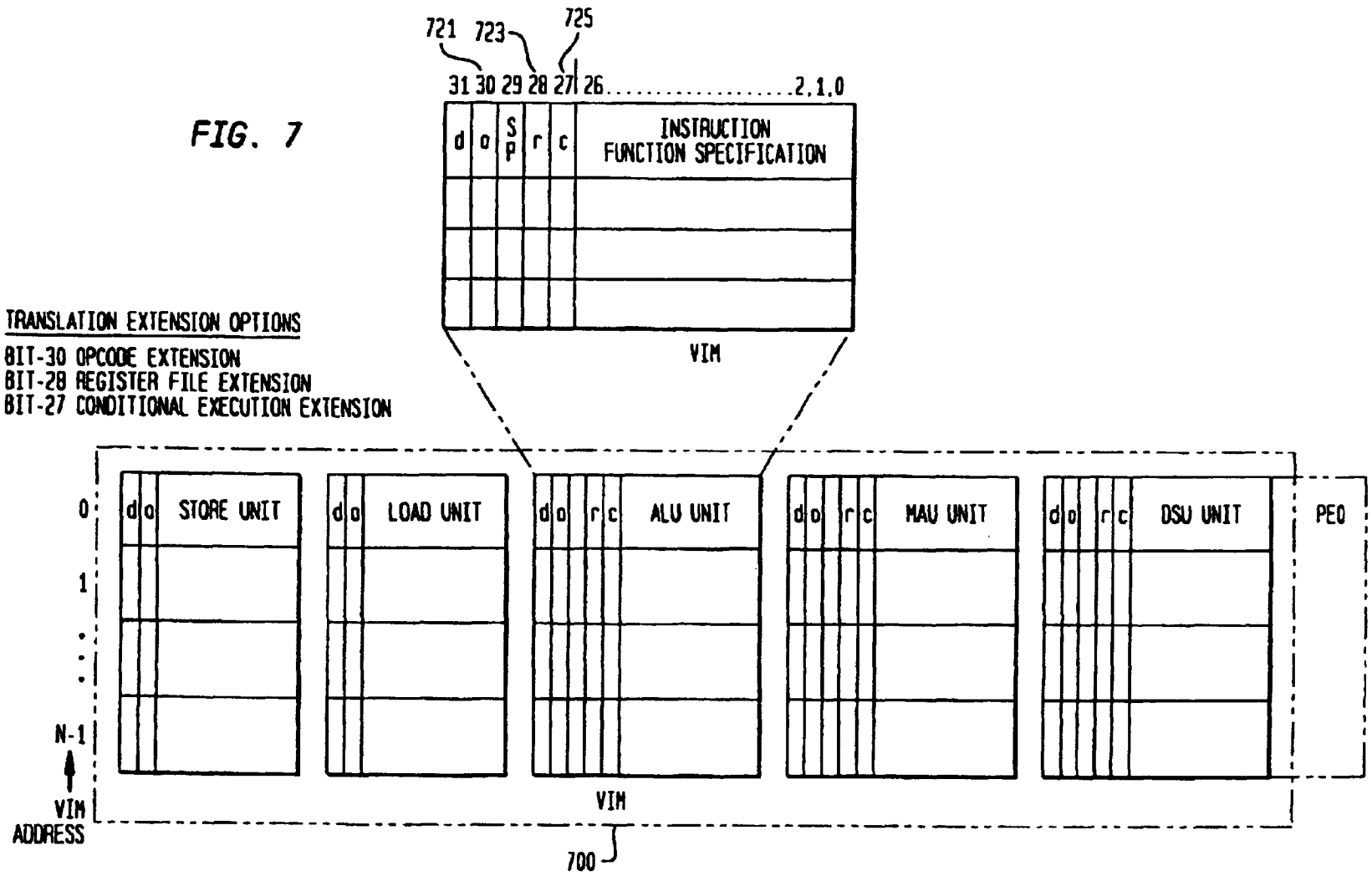
FIG. 7 illustrates an iVLIW translation extension.

It is noted, that in the previous discussion, covered by FIGS. 3, 5, and 6, the pre-decode function allows the multiple bit-31 position of the VIM slot fields to be written with the stored d-bits 518 shown in FIG. 5, that were generated from the LV instruction that initiated the VIM loading sequence. It is further noted that the unit field, bits 27 and 28, in the arithmetic instructions, see, for example, FIG. 4E, is needed to determine which VIM slot an arithmetic instruction is to be loaded into. Consequently, since the instruction in IR1 can be specifically associated with the execution unit slot in VIM by use of the pre-decode function, the Group bits and Unit field bits do not need to be stored in the VIM and can be used for other purposes as demonstrated by use of the single d-bit in the previous discussion. The specific bit positions in the VIM slots are shown in VIM 700 in FIG. 7, wherein one of the instruction group bits, bit 30 of FIG. 4E, and the instruction Unit field bits, bits 27 and 28 are replaced in VIM 700 by the Translation Extension Option bits "o" for Opcode Extensions bit-30 labeled 721 of FIG. 7, "r" for Register File Extensions bit-28 labeled 723, and "c" for Conditional Execution Extensions bit-27 labeled 725. These additional bits are separately stored in a miscellaneous register 850 shown in FIG. 8A, that the programmer can load to or store from. These bits provide extended capabilities that could not provide due to lack of instruction encoding bits in a 32-bit instruction format. For the opcode extension bit "o", it is possible to map one set of instructions into a new set of instructions. For the register extension bit "f", it is possible to double the register file space and have two banks of registers providing either additional register space or to act as a fast context switching mechanism allowing two register banks to be split between two contexts. For the condition execution extension bit "c", it is possible to specify two different sets of conditions or specify a different conditional execution functionality under programmer control.

Figure 8A:
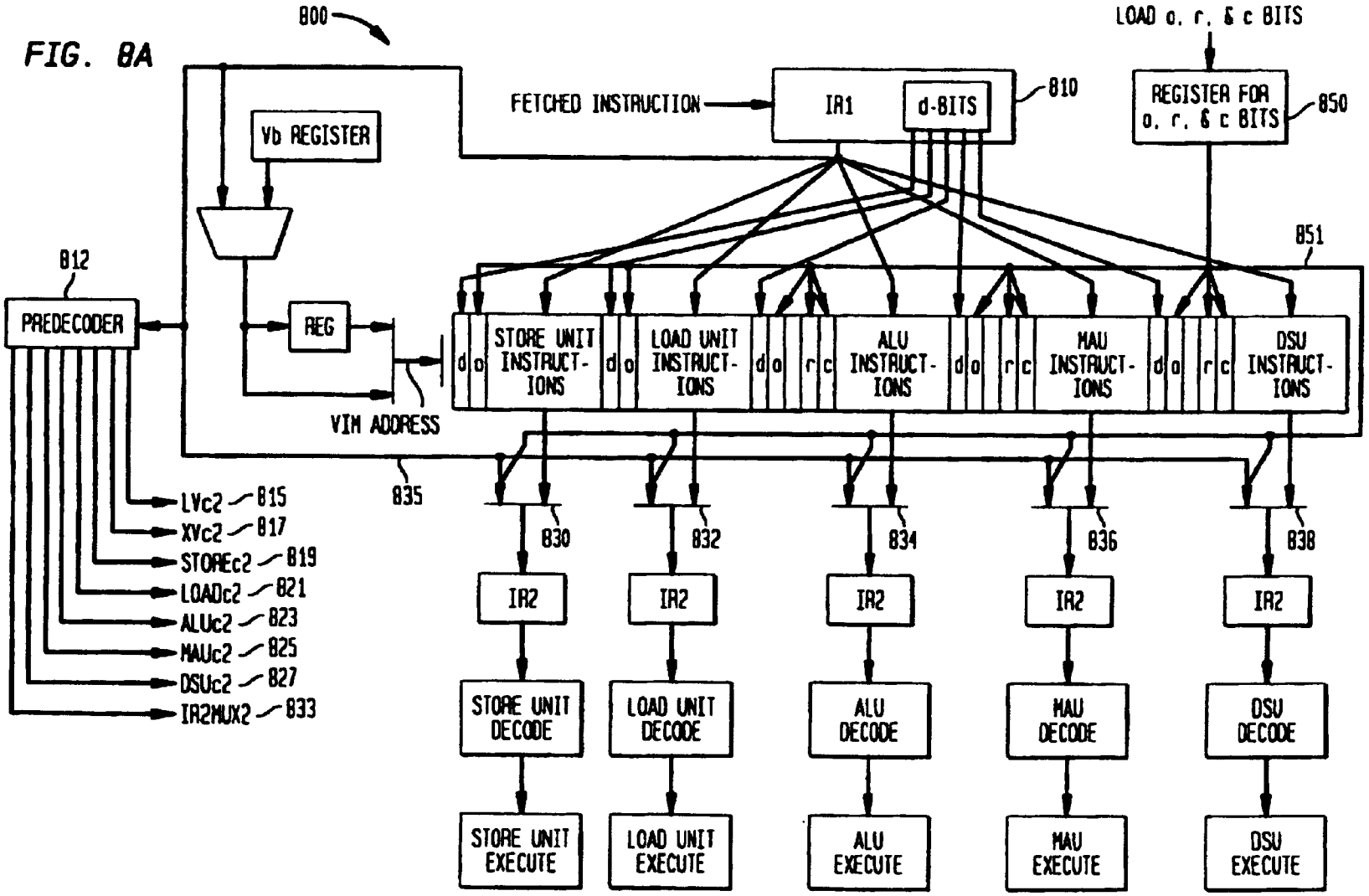
FIG. 8A illustrates an iVLIW translation extension load and fetch pipeline.

FIG. 8A depicts an iVLIW system 800 which illustrates aspects of the iVLIW translation extension load and fetch pipeline showing the addition of the o,r and c bits register 850 and the set of pre-decode control signals 815, 817, 819, 821, 823, 825, 827, and 833. It is noted that other uses of these freed up bits are possible. For example, all three bits could be used for register file extension providing either individual control to the three operand instructions or providing up to eight blanks of 32×32 registers.

To allow a single 32-bit instruction to execute by itself in the iVLIW PE or iVLIW SP, the bypass VIM path 835 is shown in FIG. 8A. For example, when a simplex ADD instruction is received into IR1 810 for parallel array execution, the pre-decode function 812 generates the IR2MUX2 833 control signal, which in conjunction with the instruction type pre-decode signal, 823 in the case of an ADD, and lack of an XV 817 or LV 815 active control signal, causes the ALU multiplexer 834 to select the bypass path 835. Since as described herein, the bypass operation is to occur during a full stage of the pipeline, it is possible to replace the group bits and the unit field bits in the bypassed instructions as they enter the IR2 latch stage. This is indicated in FIG. 8A by the "o,r, and c" bits signal path 851 being used to replace the appropriate bit positions at the input to the multiplexers 830, 832, 834, 836, and 838.

Figure 8B:
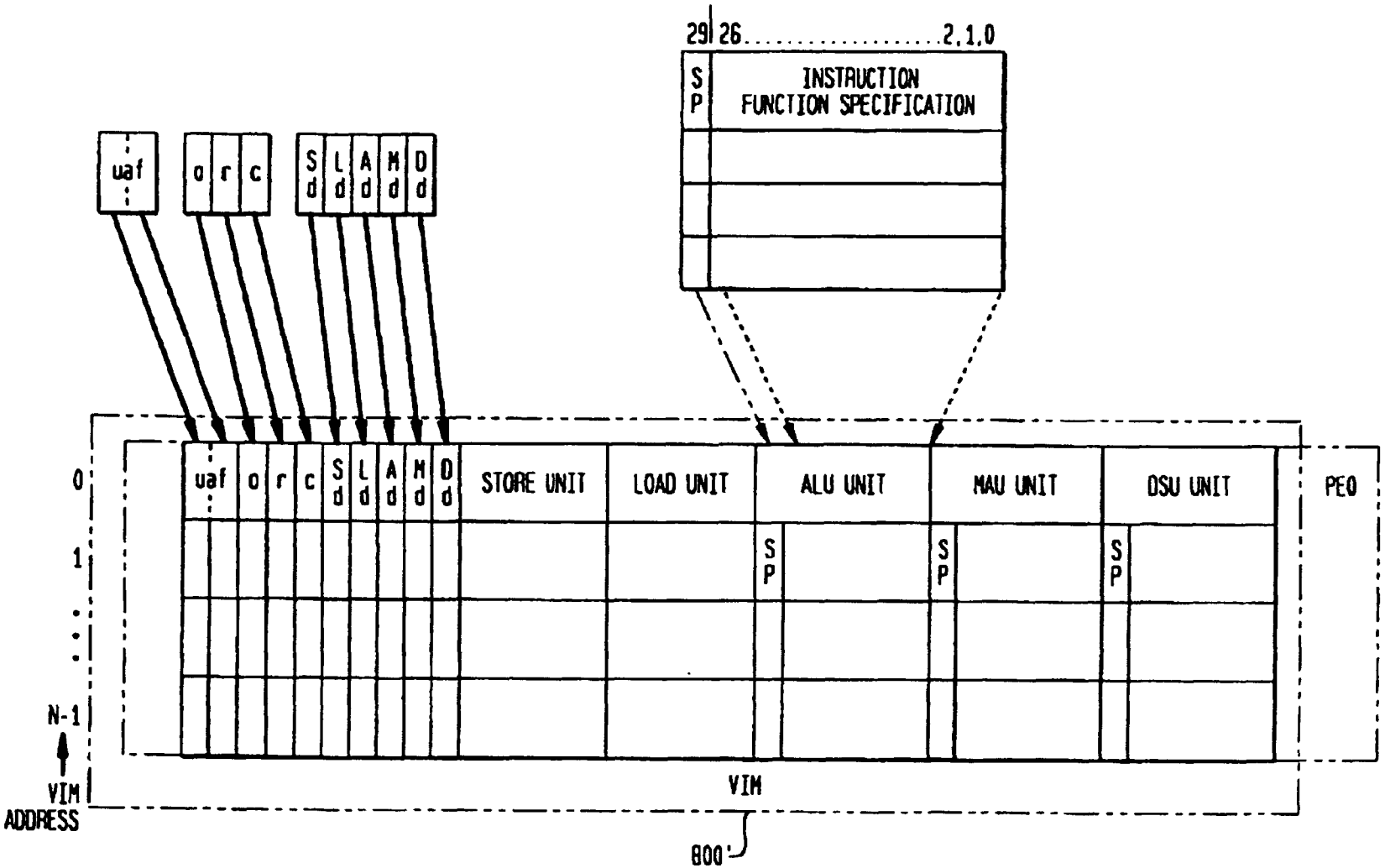
FIG. 8B illustrates an alternative format for VIM iVLIW shortage.

It is noted that alternative formats for VIM iVLIW storage are possible and may be preferable depending upon technology and design considerations. For example, FIG. 8B depicts an alternative form VIM 800' from that shown in FIGS. 7 and 8A. The d-bits per execution slot are grouped together with the additional bits "o, r, c and uaf" bits. These ten bits are grouped separately from the execution unit function bits defined in bits 0–26,29 per each slot. The unit affecting field (uaf) bits 22 and 23 of FIG. 4A from the LV instruction are required to be stored at a single iVLIW VIM address since the "uaf" bits pertain to which arithmetic unit affects the flags at the time of execution. Other storage formats are possible, for example, storing the d-bits with the function bits and the bits associated with the whole iVLIW, such as the "uaf" bits, stored separately. It is also noted that for a k-slot iVLIW, k*32-bits are not necessarily required to be stored in VIM. Due to the pre-decoder function, not only can additional bits be stored in the k*32-bit space assumed to be required to store the k 32-bit instructions, but the k*32-bit space can be reduced if full utilization of the bits is not required. This is shown in FIG. 8B, where the total number of storage bits per VIM address is given by five times the 28-bits required per execution unit slot position (0–26 and 29) plus five d-bits, plus three "o, r, and c" bits plus 2 "uaf" bits for a total of 150 bits per iVLIW address which is less than the 5*32=160-bits that might be assumed to be required. Increased functionality while reducing VIM memory space results. In general, additional information may be stored in the VIM individually per execution unit or as separate individual bits which affect control over the iVLIW stored at that VIM address. For example, sixteen additional load immediate bits can be stored in a separate "constant" register and loaded in a VIM address to extend the Load Unit's capacity to load 32 bits of immediate data. To accomplish this extension, the VIM data width must be expanded appropriately. Also the size of the stored iVLIWs is decoupled from being a multiple of the instruction size thereby allowing the stored iVLIW to be greater than or less than the k*32-bits for a k instruction iVLIW, depending upon requirements.

Figure 9:
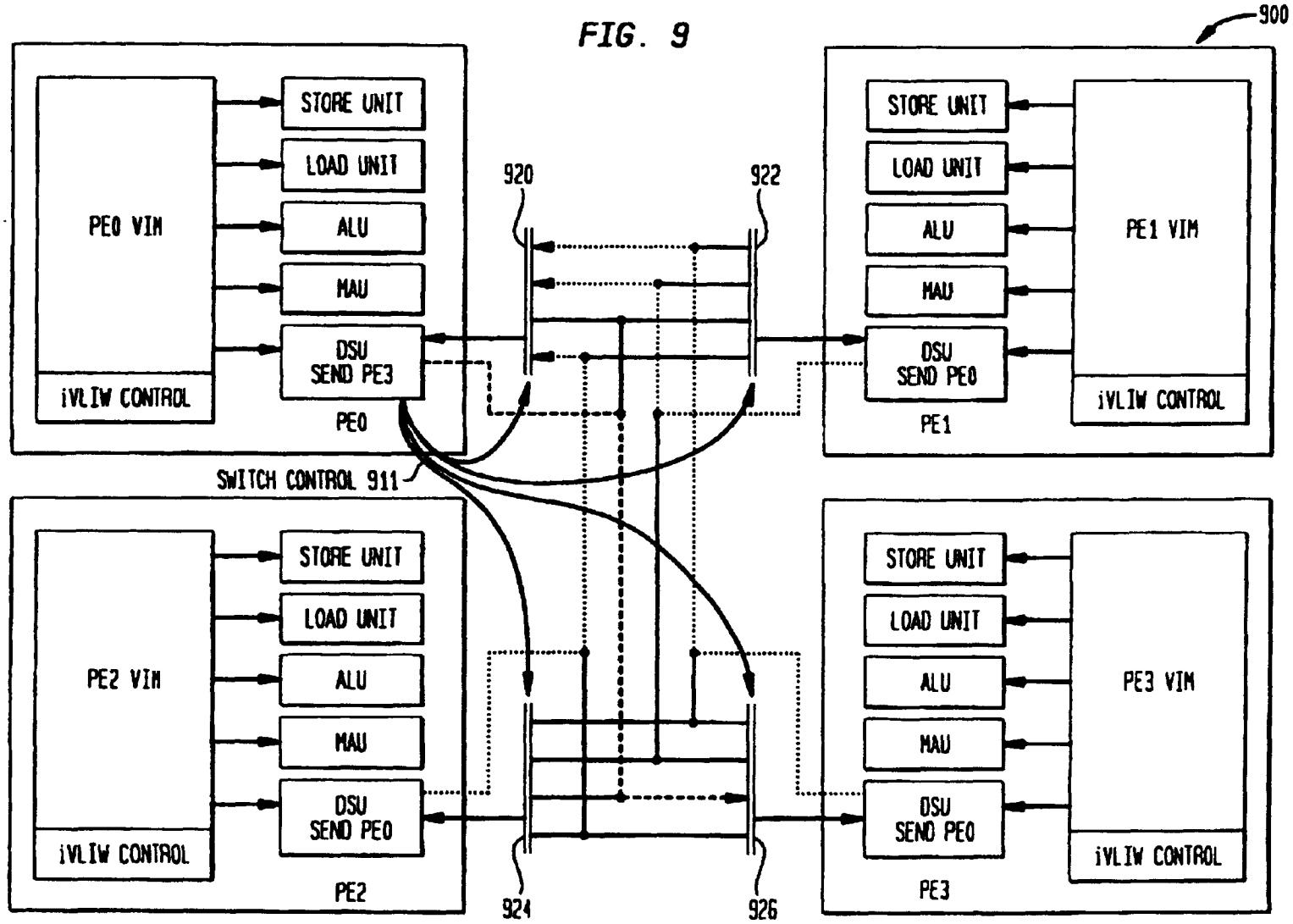
FIG. 9 illustrates a send model cluster switch control and an exemplary hazard for SMIMD communications using the send model.
Figure 10:
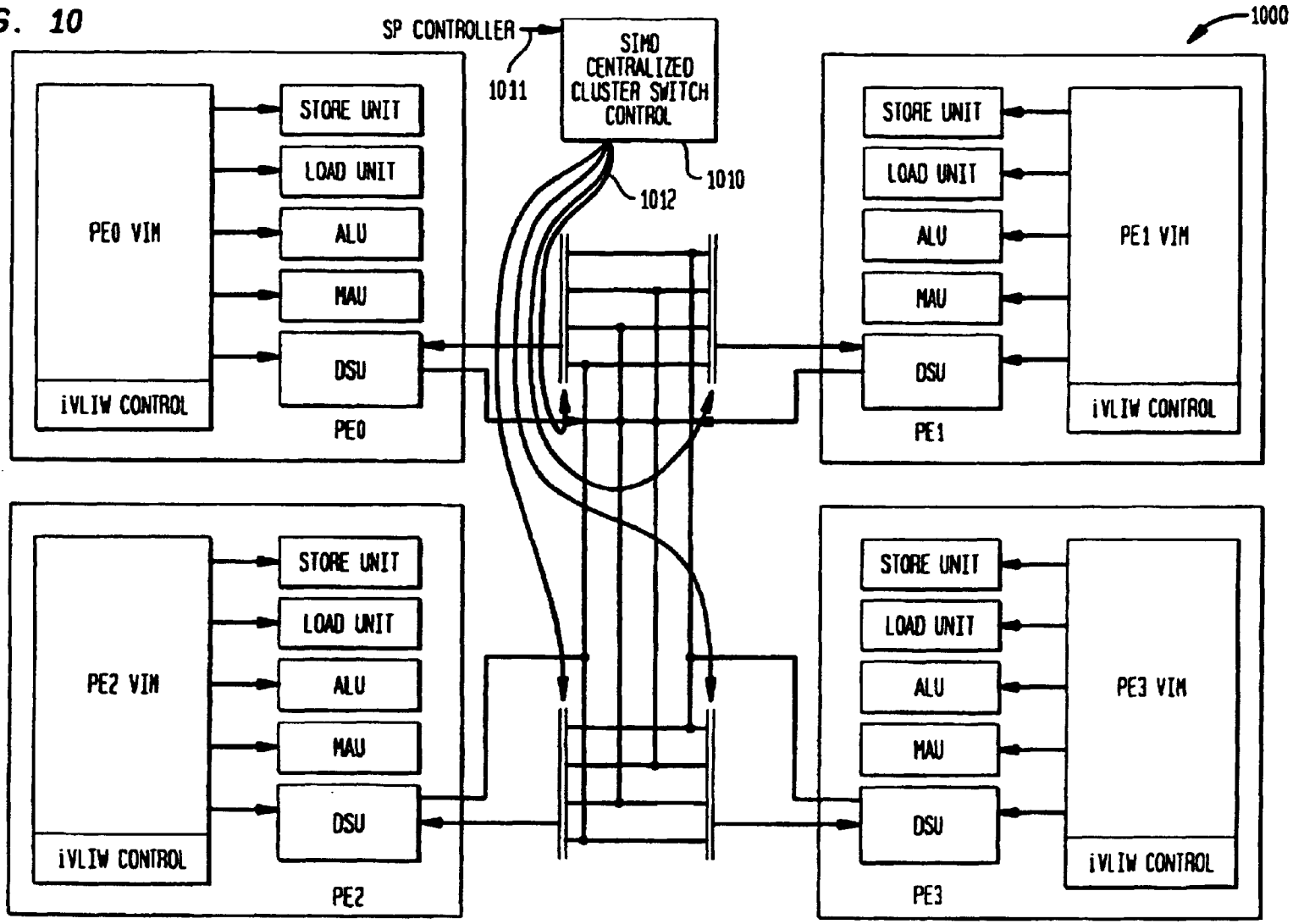
FIG. 10 illustrates a send model with a centralized cluster switch control.

In a processor consisting of an SP controller 102 as in FIG. 1 but not shown for clarity in FIG. 9 or FIG. 10 and an array of PEs, such as processor 900 of FIG. 9, or processor 1000 of FIG. 10, a problem may be encountered when implementing SMIMD operations when dealing with inter-PE communications. The typical SIMD mode of communications specifies all PEs execute the same inter-PE communication instruction. This SIMD inter-PE instruction, being the same in each PE, requires a common controlling mechanism to ensure compliance with the common operation defined between the PEs. Typically, a Send Model is used where a single instruction, such as SEND-WEST, is dispatched to all PEs in the array. The SIMD inter-PE communication instruction causes a coordinated control of the network interface between the PEs to allow each PE to send data to the PE topologically defined by the inter-PE instruction. This single SIMD instruction can be interpreted and the network interface 911 can be controlled by a single PE as shown in FIG. 9 since all PEs receive the same instruction. It is noted that the ManArray 2×2 cluster switch, shown in FIG. 9, is made up of four 4-to-1 multiplexers 920, 922, 924, and 926, for the interface Input/Output (I/O) buses between the DSU. These buses can be 8, 9, 16, 32, 64, or other number of bit, bit buses without restriction. The control of a single 4-to-1 multiplexer requires only two bits of control to select one out of four of the possible paths. This can be extended for larger clusters of PEs as necessary with larger multiplexers. It is also possible in a SIMD system to have a centralized control for the intrface network between PEs as shown in FIG. 10. In FIG. 10, a centralized controller 1010 receives the same dispatched inter-PE communication instruction 1011 from the SP controller as do the other PEs in the network. This mechanism allows the network connections to be changed on a cycle-by-cycle basis. Two attributes of the SIMD Send Model are a common instruction to all PEs and the specification of both sender and receiver. In the SIMD mode, this approach is not a problem.

In attempting to extend the Send Model into the SMIMD mode, toher problems may occur. One such problem is that in SMIMD mode it is possible for multiple processing elements to all attempt to send data to a single PE, since each PE can receive a dfiferent inter-PE communication instruction. The two attributes of the SIMD Send Model break down immediately, naemly having a common inter-PE instruction and specifying both source and target, or, in other words, both sender and receiver. It is a communications hazard to have more than one PE target the same PE in a SIMD model with single cycle communication. This communication hazard is shown in FIG. 9 wherein the DSUs for PEs 1, 2 and 3 are to send data to PE0 while PE0 is to send data to PE3. The three data inputs to PE0 cannot be received. In other systems, the resolution of this type of problem many times causes the insertion of interface buffers and priority control logic to delay one or more of the conflicting paths. This violates the inherently synchronous nature of SMIMD processing since the scheduling of the single cycle communications operations must be done during the programming of the iVLIW instructions to be executed in the PEs. To avoid the communication hazards without violating the synchronous MIMD requirements, a Receive Model is advantageously employed. The single point of network control, be it located in a single PE or in a centralized control mechanism, that is facilitated by the Send Model is replaced in the Receive Model with distributed network interface control. Each PE controls its own receiver port. The Receive Model specifies the receive path through the network interface. In the case of the ManArray network, each PE controls its own multiplexer input path of the cluster switch.

Figure 11:
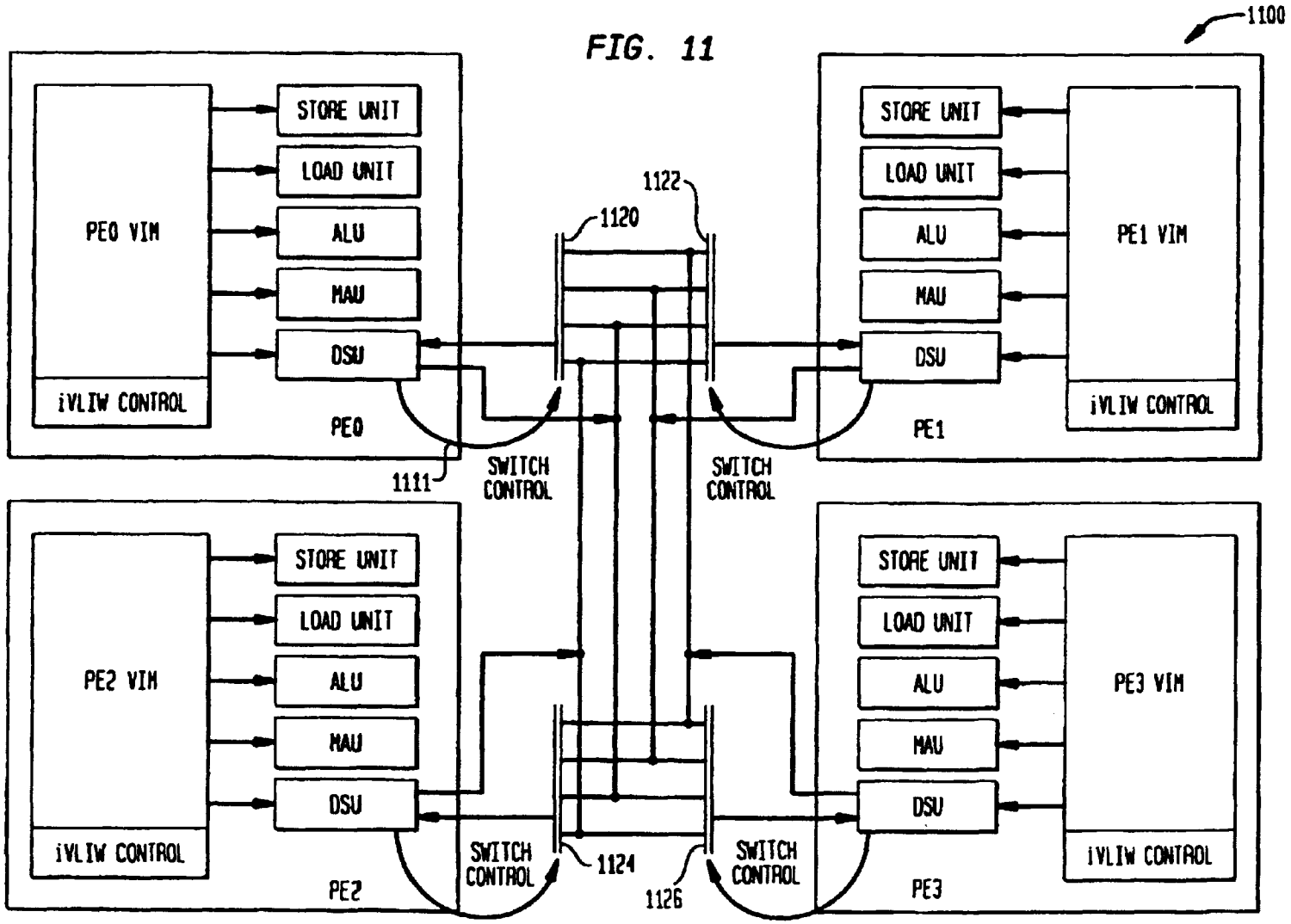
FIG. 11 illustrates a receive model cluster switch control used to avoid communications hazards in the SMIMD mode of operation.

This arrangement is shown for a 2×2 array processor 1100 in FIG. 11 where each PE has its own control of its input multiplexer, 1120, 1122, 1124 or 1126, respectively. For example, PE0 has control signals 1111 for controlling its input multiplexer 1120. The Receive Model also requires that data be made available on the PEs output port to the interface network without target PE specification. Consequently, for any meaningful communication to occur between processing elements using the Receive Model, the PEs must be programmed to cooperate in the receiving of the data that is made availabe. Using Synchronous MIMD, this cooperation is guaranteed to occur if the cooperating instructions exist in the same iVIW location. With this location of instructions when an XV instruction is executed, the cooperating PEs execute the proper inter-PE communications instructions to cuase data movement between any two or more PEs. In general, in an array of PEs, there can be multiple groups of PEs. In each such a group, a one or more PEs can receive data from another PE while in another group one or more PEs can receive data from a different PE. A group can vary in size from two PEs to the whole array of PEs. While FIG. 11 does not show an SP, such as the SP controller 102 of FIG. 1, for case and clarity of illustration, such a controller will preferably be included although it will be recognized that SP functionality can be merged with a PE such as PE0 as taught in U.S. Provisional Application Ser. No. 60/077,457 previously incorporated by reference, or SP functionality could be added toall of the PEs although such increased functionality would be relatively costly.

FIG. 4F shows the definition 470 of three Synchronous-MIMD iVLIWs in a 2×2 ManArray configuration. The top section 480 gives a descriptive view of the operation. The bottom section 490 gives the corresponding instruction mnemonics which are loaded in the LU, MAU, ALU, DSU, and SU, respectively. Each iVLIW contains four rows between thick black lines, one for each PE. The leftmost column of the figure shows the address where the iVLIW is loaded in PE iVLIW Instruction Memory (VIM). The next column shows the PE numer. Each iVLIW contains one row for each PE, showing the instructions which are loaded into that PE's VIM entry. The remaining columns list the instruction for each of the five execution units: Load Unit (LU), Multiply-Accumulate Unit (MAU), Arithmetic Logic Unit (ALU), Data Select Unit (DSU), and Store Unit (SU).

For example, VIM entry number 29 in PE2495 is loaded with the four instructions li.p.w R3, A1+, A7, fmpy.pm.1fw R5, R2, R31, fadd.pa.1fw R9, R7, R5, and pexchg.pd.w R8, R0, 2×2_PE3. These instructions are those found in the next to last row of FIG. 4F. That same VIM entry (29) contains different instructions in PEs 0, 1, and 3, as can be seen by the rows corresponding to thes PEs on VIM entry 29, for PE0 491, PE2 493, and PE3 497.

The following example 1-1 shows the sequence of instructions which load the PE VIM memories as defined in FIG. 4F. Note that PE Masking is used in order to load different instructions into different PE VIMs at the same address.

EXAMPLE 1-1

Loading Synchronous MIMD iVLIWs into PE VIMs

```
! first load in instructions common to PEs 1, 2, 3
lim.s.h0 SCR1, 1                    ! mask off PEO in order to load in 1, 2, 3
lim.s.h0 VAR, 0                     ! load VIM base address reg v0 with zero
lv.p v0, 27, 2, d=, f=              ! load VIM entry v0+27 (=27) with the
                                    ! next two instructions; disable no
                                    ! instrs; default flag setting to ALU
    li.p.w R1, A1+, A7                  ! load instruction into LU
    fmpy.pm.1fw R6, R3, R31             ! mpy instruction into MAU
lv.p v0, 28, 2, d=, f=              ! load VIM entry v0+28 (=28) with the
                                    ! next two instructions; disable no
                                    ! instrs; default flag setting to ALU
    li.p.w R2, A1+, A7                  ! load instruction into LU
    fmpy.pm.1fw R4, R1, R31             ! mpy instruction into MAU
lv.p v0, 29, 2, d=, f=              ! load VIM entry v0+29 (=29) with the
                                    ! next two instructions; disable no
                                    ! instrs; default flag setting to ALU
    li.p.w R3, A1+, A7                  ! load instruction into LU
    fmpy.pm.1fw R5, R2, R31             ! mpy instruction into MAU
! now load in instructions unique to PEO
lim.s.h0 SCR1, 14                   ! mask off PEs 1, 2, 3 to load PEO
nop                                 ! one cycle delay to set mask
lv.p v0, 27, 1, d=!mad, f=          ! load VIM entry v0+27 (=27) with the
                                    ! next instruction; disable instrs
                                    ! in LU, MAU, ALU, DSU slots; default
                                    ! flag setting to ALU
    si.p.w R1, A2+, R28                 ! store instruction into SU
lv.p v0, 28, 1, d=!mad, f=          ! load VIM entry v0+28 (=28) with the
                                    ! next instruction; disable instrs
                                    ! in LU, MAU, ALU, DSU slots; default
                                    ! flag setting to ALU
    si.p.w R1, A2+, R28                 ! store instruction into SU
lv.p v0, 29, 1, d=!mad, f=          ! load VIM entry v0+29 (=29) with the
                                    ! next instruction; disable instrs
                                    ! in LU, MAU, ALU, DSU slots; default
                                    ! flag setting to ALU
```

-continued

```
    si.p.w R1, A2+, R28                 ! store instruction into SU
! now load in instructions unique to PE1
lim.s.h0 SCR1, 13                       ! mask off PEs 0, 2, 3 to load PE1
nop                                     ! one cycle delay to set mask
iv.p v0, 27, 3, d=, f=                  ! load VIM entry v0+27 (=27) with the
                                        ! next three instructions; disable no
                                        ! instrs; default flag setting to ALU
    fadd.pa.1fw R10, R9, R8             ! add instruction into ALU
    pexchg.pd.w R7, R0, 2x2__PE3        ! per comm instruction into DSU
    si.p.w R10, +A2, A6                 ! store instruction into SU
lv.p v0, 28, 2, d=s, f=                 ! load VIM entry v0+28 (=28) with the
                                        ! next two instructions; disable instr
                                        ! in SU slot; default flag setting to ALU
    fadd.pa.1fw R9, R7, R4              ! add instruction into ALU
    pexchg.pd.w R8, R5, 2x2__PE2        ! per comm instruction into DSU
lv.p v0, 29, 3, d=, f=                  ! load VIM entry v0+29 (=29) with the
                                        ! next three instructions; disable no
                                        ! instrs; default flag setting to ALU
    fcmpLE.pa.1fw R10, R0               ! compare instruction into ALU
    pexchg.pd.w R15, R6, 2x2__PE1       ! pe comm instruction into DSU
    t.sii.p.w R0, A2+, 0                ! store instruction into SU
! now load in instructions unique to PE2
lim.s.h0 SCR1, 11                       ! mask off PEs 0, 1, 3 to load PE2
nop                                     ! one cycle delay to set mask
lv.p v0, 27, 3, d=, f=                  ! load VIM entry v0+27 (=27) with the
                                        ! next three instructions; disable no
                                        ! instrs; default flag setting to ALU
    fcmpLE.pa.1fw R10, R0               ! compare instruction into ALU
    pexchg.pd.w R15, R6, 2x2__PE2       ! pe comm instruction into DSU
    t.sii.p.w R0, A2+, 0                ! store instruction into SU
lv.p v0, 28, 3, d=, f=                  ! load VIM entry v0+28 (=28) with the
                                        ! next three instructions; disable no
                                        ! instrs; default flag setting to ALU
    fadd.pa.1fw R10, R9, R8             ! add instruction into ALU
    pexchg.pd.w R7, R4, 2x2__PE1        ! pe comm instruction into DSU
    si.p.w R10, +A2, A6                 ! store instruction into SU
lv.p v0, 29, 2, d=s, f=                 ! load VIM entry v0+29 (=29) with the
                                        ! next two instructions; disable instr
                                        ! in SU slot; default flag setting to ALU
    fadd.pa.1fw R9, R7, R5              ! add instruction into ALU
    pexchg.pd.w R8, R0, 2x2__PE3        ! pe comm instruction into DSU
! now load in instructions unique to PE3
lim.s.h0 SCR1, 7                        ! mask off PEs 0, 1, 2 to load PE3
nop                                     ! one cycle delay to set mask
lv.p v0, 27, 2, d=s, f=                 ! load VIM entry v0+27 (=27) with the
                                        ! next two instructions; disable instr
                                        ! in SU slot; default flag setting to ALU
    fadd.pa.1fw R9, R7, R6              ! add instruction into ALU
    pexchg.pd.w R8, R4, 2x2__PE2        ! pe comm instruction into DSU
lv.p v0, 28, 2, d=d, f=                 ! load VIM entry v0+28 (=28) with the
                                        ! next 2 instructions; disable instr in
                                        ! DSU slot; default flag setting to ALU
    fcmpLE.pa.1fw R10, R0               ! compare instruction into ALU
    t.sii.p.w R0, A2+, 0                ! store instruction into SU
lv.p v0, 29, 3, d=, f=                  ! load VIM entry v0+29 (=29) with the
                                        ! next three instructions; disable no
                                        ! instrs; default flag setting to ALU
    fadd.pa.1fw R10, R9, R8             ! add instruction into ALU
    pexchg.pd.w R7, R5, 2x2__PE1        ! pe comm instruction into DSU
    si.p.w R10, +A2, A6                 ! store instruction into SU
lim.s.h0 SCR1, 0                        ! reset PE mask so all PEs are on
nop                                     ! one cycle delay to set mask
```

The following example 1-2 shows the sequence of instructions which execute the PE VIM entries as loaded by the example 1-1 code in FIG. 4F. Note that no PE Masking is necessary. The specified VIM entry is executed in each of the PEs, PE0, PE1, PE2, and PE3.

EXAMPLE 1-2

Executing Synchronous MIMD iVLIWs from PE VIMs

```
! address register, loop, and other setup would be here
. . .
! startup VLIW execution
! f= parameter indicates default to LV flag setting
xv.p v0, 27, e=l, f=          ! execute VIM entry V0+27, LU only
xv.p v0, 28, e=lm, f=         ! execute VIM entry V0+28, LU, MAU only
xv.p v0, 29, e=lm, f=         ! execute VIM entry V0+29, LU, MAU only
xv.p v0, 27, e=lmd, f=        ! execute VIM entry V0+27, LU, MAU,
                              DSU only
xv.p v0, 28, e=lamd, f=       ! execute VIM entry V0+28, all units
                              except SU
xv.p v0, 29, e=lamd, f=       ! execute VIM entry V0+29, all units
                              except SU
xv.p v0, 27, e=lamd, f=       ! execute VIM entry V0+27, all units
                              except SU
xv.p v0, 28, e=lamd, f=       ! execute VIM entry V0+28, all units
                              except SU
xv.p v0, 29, e=lamd, f=       ! execute VIM entry V0+29, all units
                              except SU
! loop body - mechanism to enable looping has been previously set up
loop_begin: xv.p v0, 27, e=slamd, f=   ! execute v0+27, all units
      xv.p v0, 28, e=slamd, f=         ! execute v0+28, all units
loop_end: xv.p v0, 29, e=slamd, f=     ! execute v0+29, all units
```

Description of Exemplary Algorithms Being Performed

The iVLIWs defined in FIG. 4F are used to effect the dot product of a constant 3×1 vector with a stream of variable 3×1 vectors stored in PE local data memories. Each PE stores one element of the vector. PE1 stores the x component, PE2 stores the y component, and PE3 stores the z component. PE0 stores no component. The constant vector is held in identical fashion in a PE register, in this case, compute register R31.

In order to avoid redundant calculations or idle PEs, the iVLIWs operate on three variable vectors at a time. Due to the distribution of the vector components over the PEs, it is not feasible to use PE0 to compute a $4^{th}$ vector dot product. PE0 is advantageously employed instead to take care of some setup for afuture algorithm stage. This can be seen in the iVLIW load slots, as vector 1 is loaded in iVLIW 27 (component-wise across the PEs, as described above), vector 2 is loaded in iVLIW 28, and vector 3 is loaded in iVLIW 29 (lo.p.w R*, A1+, A7). PE1 computes the x component of the dot product for each ofthe three vectors. PE2 computes the y component, and PE3 computes the z component (ftopy.pm.1fw R*, R*, R31). At this point, the communication among the PEs must occur in order to get the y and z components of the vector 1 dot product to PE1, and x and z components of the vector 2 dot product to PE2, and the x and y components of the vector 3 dot product to PE3. This communication occurs in the DSU via the pexchg instruction. In this way, each PE is summing (fadd.pa.1fw R9, R7, R* and fadd.pa.1fw R10, R9, R8) the components of a unique dot product result simultaneously. These results are then stored (si.p.w. R10, +A2, A6) into PE memories. Note that each PE will compute and store every third result. The final set of results are then accessed in round-robin fashion from PEs 1, 2, and 3.

Additionally, each PE performs a comparison (fcmpLE.pa.1fw R10, R0) of its dot product result with zero (held in PE register R0), and conditionally stores a zero (t.sii.p.w R0, A2+, 0) in place of the computed dot product if that dot product was negative. In other words, it is determined if the comparison is R10 less than R0? is true. This implementation of adot product with removal of negative values is used, for example, in lighting calculations for 3D graphics applications.

While the present invention has been disclosed in the context of presently preferred methods and apparatus for carrying out the invention, variuos alternative implementations and variations wil be readily apparetn to those of ordinary skill in the art. By way of example, the present invention does not preclude the ability to load an instruction into VIM and also execute the instruction. This capability was deemed an unnecesary complication for the presently preferred programming model among other considerations such as instruction formats and hardware complexity. Consequently, the Load iVLIW delimiter approach was chosen.

We claim:

1. An indirect very long instruction word (VLIW) processing system comprising:

a first processing element (PE) having a VLIW instruction memory (VIM) for storing function instructions in slots within a VIM memory location;

a first register for storing *a control instruction and* a function instruction*, the function instruction* having a plurality of definition bits defining both [a] *the* control instruction type and an execution unit type of the function instruction;

a predecoder for decoding the plurality of definition bits; and a load mechanism for loading the function instruction in one of said slots in VIM based upon both said decoding, and a control instruction defining a load operation.

2. The system of claim 1 wherein the predecoder is for decoding an execute VLIW control instruction containing an address offset and a pointer to a base address register for indirectly exeucting VLIWs.

3. The system of claim 1 wherein the predecoder is for decoding said control instruction defining a load operation containing an address offset and pointer to a base address register for loading the function instruction.

4. The system of claim 1 wherein the definition bits are removed from the function instruction before the function instruction is stored in VIM.

5. The system of claim 1 wherein the definition bits are removed from the function instruction and at least one simplex control bit is added to the fucntion instruction before the function instruction is stored in VIM.

6. The system of claim 5 wherein the at least one simplex control bit includes an enable/disable bit.

7. The system of claim 5 wherein the at least one simplex control bit includes an operation code extension bit.

8. The system of claim 5 wherein the at least one simplex control bit includes a register file extension bit.

9. The system of claim 5 wherein the at least one simplex control bit includes a conditional execution extension bit.

10. The system of claim 9 further comprising a plurality of execution units, and first and second banks of registers, and the register file extension bit is utilized to determine whether the plurality of execution units read from or write to the first bank of registers or the second bank of registers.

11. The system of claim 1 further comprising a second register for storing the function instruction; a bypass path for connecting an output of the first register to an input of the second register; and a selection mechanism for selecting a bypass operation in which the function instruction is passed from the first register to the second register without being loaded into VIM.

12. The system of claim 1 further comprising at least one additional PE connected through a network interface connection to the first PE, and each PE has an associated cluster switch connected to a receive port such that each PE controls a portion of the cluster switch.

13. The system of claim 12 wherein the associated cluster switch comprises at least one multiplexer per PE interconnected to provide independent paths between the PEs in a cluster of PEs.

14. The system of claim 1 further comprising a sequence processor (SP) connected to the first PE and providing both said control instruction and said function instruction to the first PE, the control instruction containing an address offset and a ponter to a base address register for loading the function instruction.

15. The system of claim 14 further comprising at least one additional PE connected to the SP and said control instruction is provided synchronously to both the first PE and said at least one additional PE.

16. The system of claim 15 wherein a plurality of PEs are connected to the SP and the plurality of PEs is organized into first and second groups of one or more PEs.

17. The system of claim 16 wherein the first group of PEs indirectly operate on a VLIW instruction ata first VIM address during a cycle of operation and the second group of PEs indirectly operate on a different VLIW instruction at the same first VIM address during the cycle of operation.

18. The system of claim 16 wherein the plurality of PEs operate following a receive model of communication control in which each PE has a receive port and controls whether data is received at the receive port.

19. The system of claim 18 wherein each PE has a output port for making data available in the cluster switch.

20. The system of claim 18 whereby each PE has an input multiplexer connected to the receive port and controls communication by controlling said input multiplexer.

21. The system of claim 18 wherein the plurality of PEs are programmed to cooperate by storing a cooperating instruction so that one PE has a receive instruction specifying the path that the other PE is making data available on in the same location in VIM for each of said plurality of PEs.

22. The system of claim 16 further comprising a masking mechanism for masking individual PEs ON or OFF.

23. The system of claim 22 in which VIMs for PEs masked ON are loaded and VIMs for PEs masked OFF are not loaded during al oad VLIW operation.

24. The system of claim 16 wherein different PEs execute different VLIWs at the same VIM address during the same cycle.

25. The system of claim 1 wherein the VIM comprises slots for storing function instructions of the following type: store unit instructions; load unit instructions; arithmetic logic unit instructions; mulitply-accumulate unit instructions; or data select unit instructions.

*26. A processing system comprising:*

*a plurality of processing elements (PEs) communicatively connected to each other, each of said PEs including a very long instruction word (VLIW) memory (VIM) for storing VLIWs to be executed by each PE; and*

*a sequence processor (SP) operable for concurrently initiating indirect execution of a VLIW stored at a first address in the VIM of each PE, in response to the SP issuing an indirect instruction to initiate concurrent execution by each PE, each PE of said plurality of PEs concurrently executing the VLIW stored at the first address in the VIM associated with each PE, and*

*at least one of said plurality of PEs concurrently executing a VLIW at the first address of its VIM which defines a different operation from a VLIW concurrently executed by another PE of said plurality of PEs.*

*27. The processing system of claim 26 wherein the SP is further operable for concurrently initiating the execution of instructions stored in a VLIW at a second address in the VIM of each PE wherein each PE concurrently executes an instruction stored in a VLIW at the second address in the instruction memory associated with each PE, and*

*the plurality of PEs execute instructions which define the same operation.*

*28. The processing system of claim 27 wherein the plurality of PEs include a first PE and a second PE and the SP is further operable for:*

*concurrently initiating the execution of instructions stored in a VLIW at a third address in the VIMs such that the first PE executes a first instruction stored in a VLIW at the third address in the VIM associated with the first PE, and the second PE executes a second instruction stored in a VLIW at the third address in the VIM associated with the second PE.*

*29. The processing system of claim 28 wherein:*

*the first instruction and the second instruction define different operations.*

*30. The processing system of claim 28 wherein:*

*the first instruction and the second instruction define the same operation.*

*31. The processing system of claim 26 wherein the SP is further operable for executing an instruction stored in a VLIW at the first address in the VIM of one of said plurality of PEs.*

*32. The processing system of claim 26 wherein each PE includes a base address register, and wherein the first address in each PE is determined utilizing the base address register and an offset value contained in an indirect instruction issued by the SP.*

*33. The processing system of claim 26 wherein the instruction to be executed by the PEs comprises at least one very long instruction word (VLIW).*

*34. The processing system of claim 26 wherein the indirect instruction to initiate concurrent execution by each PE is an execute VLIW instruction.*

*35. The processing system of claim 34 wherein the execute VLIW instruction is operable to enable each of at least two instructions comprising a VLIW for execution.*

*36. The processing system of claim 35 wherein:*

*each PE includes a base address register; and*

*each PE determines the first address utilizing the base address register associated with each PE and an offset value contained in the execute VLIW instruction.*

*37. The processing system of claim 26 wherein:*

*each PE is operable to receive data from other PEs; and*

*each PE is operable to control from which PE data is received.*

*38. A processing system comprising:*

*a first processing element (PE) including a first instruction memory for storing a first very long instruction word (VLIW) to be executed by said first PE; and*

*a second processing element (PE) including a second instruction memory for storing a second VLIW to be executed by said second PE, said second VLIW and said first VLIW defining different operations;*

*wherein the first VLIW and the second VLIW are both stored at the same address location in each memory;*

*wherein the first PE and the second PE are operable for simultaneously executing the first VLIW and the second VLIW, respectively, in response to each PE receiving an execute very long instruction word (VLIW) instruction.*

*39. The processing system of claim 38 further comprising a sequencing processor (SP) which initiates the concurrent execution of the first instruction and the second instruction by issuing the VLIW instruction.*

*40. The processing system of claim 38 wherein*

*each PE includes a base address register; and*

*each PE determines the first address utilizing both the base address register associated with each PE and an offset value contained in the execute VLIW instruction.*

*41. The processing system of claim 38 wherein:*

*the first and second instructions comprise very long instruction word (VLIW) instructions; and*

*each VLIW instruction comprises a plurality of simplex instructions.*

*42. The processing system of claim 41 wherein:*

*each PE comprises a plurality of execution units; and*

*each simplex instruction is adapted for being executed by at least one of the execution units.*

*43. The processing system of claim 38 wherein each PE further comprises:*

*an instruction register for storing the execute VLIW instruction; and*

*a predecoder for decoding if the instruction stored in the instruction register in an execute VLIW instruction.*

*44. The processing system of claim 43 wherein the predecoder of the first PE generates a first signal which is used to initiate the load of the first instruction into the first PE, and wherein the predecoder of the second PE generates a second signal which is used to initiate the load of the second instruction into the second PE.*

*45. A processing method for a processing system comprising a first processing element (PE) including a first very long instruction word memory (VIM), the first PE communicatively connected to a second PE including a second VIM, the method comprising:*

*loading a first function instruction in the first VIM at a first address;*

*loading a second function instruction in the second VIM at the first address;*

*receiving an execute VLIW instruction; and*

*concurrently executing the first function instruction by the first PE and the second function instruction by the second PE, in response to the received execute VLIW instruction;*

*wherein the first function instruction stored in the first VIM at the first address and the second function instruction stored in the second VIM at the first address define different operations.*

*46. The method of claim 45 wherein the first PE includes a base address register and the method further comprising, before the step of loading the first function instruction:*

*receiving a load VLIW instruction which contains an address offset;*

*predecoding the load VLIW instruction; and*

*determining the first address utilizing the address offset and the base address register.*

*47. The method of claim 45 wherein the first address of the first VIM includes a plurality of slots and wherein the step of loading the first function instruction further comprises:*

*receiving the first function instruction; and*

*predecoding the first function instruction to determine into which slot the first instruction is to be loaded.*

*48. The method of claim 47 wherein the step of predecoding the first function instruction further comprises:*

*determining if any of said plurality of slots are to be disabled; and*

*if any of said plurality of slots are to be disabled, loading a disable bit in a storage bit for each slot which is to be disabled.*

*49. The method of claim 47 wherein the first function instruction includes at least one group bit defining an instruction type and at least one unit field bit defining an execution unit type, and the step of predecoding the first function instruction utilizes both the instruction type and the execution unit type to determine which slot the first function instruction should be loaded.*

*50. The method of claim 49 further comprising:*

*removing the at least one group bit and the at least one unit field bit from the first function instruction before the first function instruction is loaded into the first VIM; and*

*adding at least one replacement bit to the first function instruction.*

*51. The method of claim 45 wherein the first PE includes a base address register, wherein the execute VLIW instruction includes an address offset, and wherein the step of receiving the execute VLIW instruction further comprises:*

*predecoding the execute VLIW instruction; and*

*determining the first address utilizing the address offset and the base address register.*

*52. The processing method of claim 45 wherein the step of loading a first function instruction in the first VIM at a first address further comprises:*

*masking the first PE to be enabled; and*

*masking the second PE to be disabled.*

*53. The processing method of claim 45 wherein the step of loading a second function instruction in the second VIM at the first address further comprises:*

*masking the first PE to be disabled; and*

*masking the second PE to be enabled.*

* * * * *